US012804758B2

(12) United States Patent
Irlanki et al.

(10) Patent No.: US 12,804,758 B2
(45) Date of Patent: Nov. 17, 2026

(54) METHOD AND APPARATUS FOR TUNING SYSTEM PARAMETERS FOR ONE OR MORE NETWORK SLICES

(71) Applicant: Samsung Electronics Co., Ltd., Suwon-si (KR)

(72) Inventors: Sandeep Irlanki, Bangalore (IN); Dharma Teja Nidamanuri, Bangalore (IN); Ravish Kumar Kumawat, Bangalore (IN); Siva Sabareesh Dronamraju, Bangalore (IN); Srihari Kuncha, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 473 days.

(21) Appl. No.: 18/347,414

(22) Filed: Jul. 5, 2023

(65) Prior Publication Data

US 2024/0015833 A1 Jan. 11, 2024

Related U.S. Application Data

(63) Continuation of application No. PCT/KR2023/008962, filed on Jun. 27, 2023.

(30) Foreign Application Priority Data

Jul. 5, 2022 (IN) ............................. 202241038700
Jun. 9, 2023 (IN) ............................. 202241038700

(51) Int. Cl.
*H04W 76/20* (2018.01)
*H04W 24/08* (2009.01)
*H04W 40/02* (2009.01)

(52) U.S. Cl.
CPC ........... *H04W 76/20* (2018.02); *H04W 24/08* (2013.01); *H04W 40/02* (2013.01)

(58) Field of Classification Search
CPC ..................................................... H04W 76/20
See application file for complete search history.

(56) References Cited

U.S. PATENT DOCUMENTS 5,956,507 A 9/1999 Shearer, Jr. et al.
6,988,156 B2 1/2006 Musumeci
(Continued)

FOREIGN PATENT DOCUMENTS

CN 110380887 10/2019

OTHER PUBLICATIONS

Search Report and Written Opinion dated Sep. 21, 2023 issued in International Patent Application No. PCT/KR2023/008962.
(Continued)

*Primary Examiner* — Abdeltif Ajid
(74) *Attorney, Agent, or Firm* — NIXON & VANDERHYE P.C.

(57) ABSTRACT

A method for tuning system parameters for one or more network slices is disclosed. The method includes receiving, from a network, a set of URSP rules including slice-specific information for each of the one or more network slices, determining an application UID associated with the one or more network slices, acquiring, from one or more applications running on the UE, packet information related to each of one or more ongoing PDU sessions associated with a corresponding network slice, obtain in a flow rate for each of the one or more ongoing PDU, tuning a set of system parameters for the one or more ongoing PDU sessions, and applying one or more policies for the one or more ongoing PDU sessions.

18 Claims, 15 Drawing Sheets

(56) References Cited

U.S. PATENT DOCUMENTS

| | | | | |
|---|---|---|---|---|
| 7,076,647 | B2 | 7/2006 | Roth et al. | |
| 7,191,322 | B2 | 3/2007 | Millward et al. | |
| 9,015,622 | B2 | 4/2015 | Wörner et al. | |
| 2017/0237751 | A1* | 8/2017 | Sakurai | H04L 63/1408 726/22 |
| 2017/0245316 | A1 | 8/2017 | Salkintzis | |
| 2018/0332523 | A1* | 11/2018 | Faccin | H04W 36/0033 |
| 2019/0303222 | A1 | 10/2019 | Masputra et al. | |
| 2020/0053622 | A1* | 2/2020 | Huang-Fu | H04W 28/0268 |
| 2020/0412559 | A1* | 12/2020 | Tang | H04W 8/18 |
| 2021/0058857 | A1 | 2/2021 | Huang-Fu | |
| 2021/0194970 | A1 | 6/2021 | Li et al. | |
| 2021/0306939 | A1 | 9/2021 | Zhang et al. | |
| 2022/0045917 | A1 | 2/2022 | Uppili et al. | |
| 2022/0124595 | A1* | 4/2022 | Xu | H04W 40/248 |
| 2022/0312510 | A1* | 9/2022 | Keller | H04W 40/02 |
| 2023/0239938 | A1* | 7/2023 | Hedman | H04W 8/205 370/329 |
| 2023/0276337 | A1* | 8/2023 | Hui | H04W 40/02 370/328 |
| 2024/0370218 | A1* | 11/2024 | Chen | G06F 3/1454 |
| 2025/0184858 | A1* | 6/2025 | Skog | H04W 28/0268 |

OTHER PUBLICATIONS

3GPP TSG-RAN, "3rd Generation Partnership Project; Technical Specification Group Services and System Aspects; Policy and charging control framework for the 5G System(5GS)", Meeting Notes, Meeting #17, Jun. 2022, 147 pages.
Indian Office Action issued Jul. 31, 2025 in corresponding Indian Patent Application No. 202241038700.
3GPP TS 23.503, "5G; Policy and charging control framework for the 5G System (5GS)", Version 16.8.0 Release 16, Apr. 2021, 122 pages.
5G and Wi-Fi RAN Convergence, "Aligning the Industry on Opportunities and Challenges", Version 1, Apr. 2021, 72 pages.

* cited by examiner

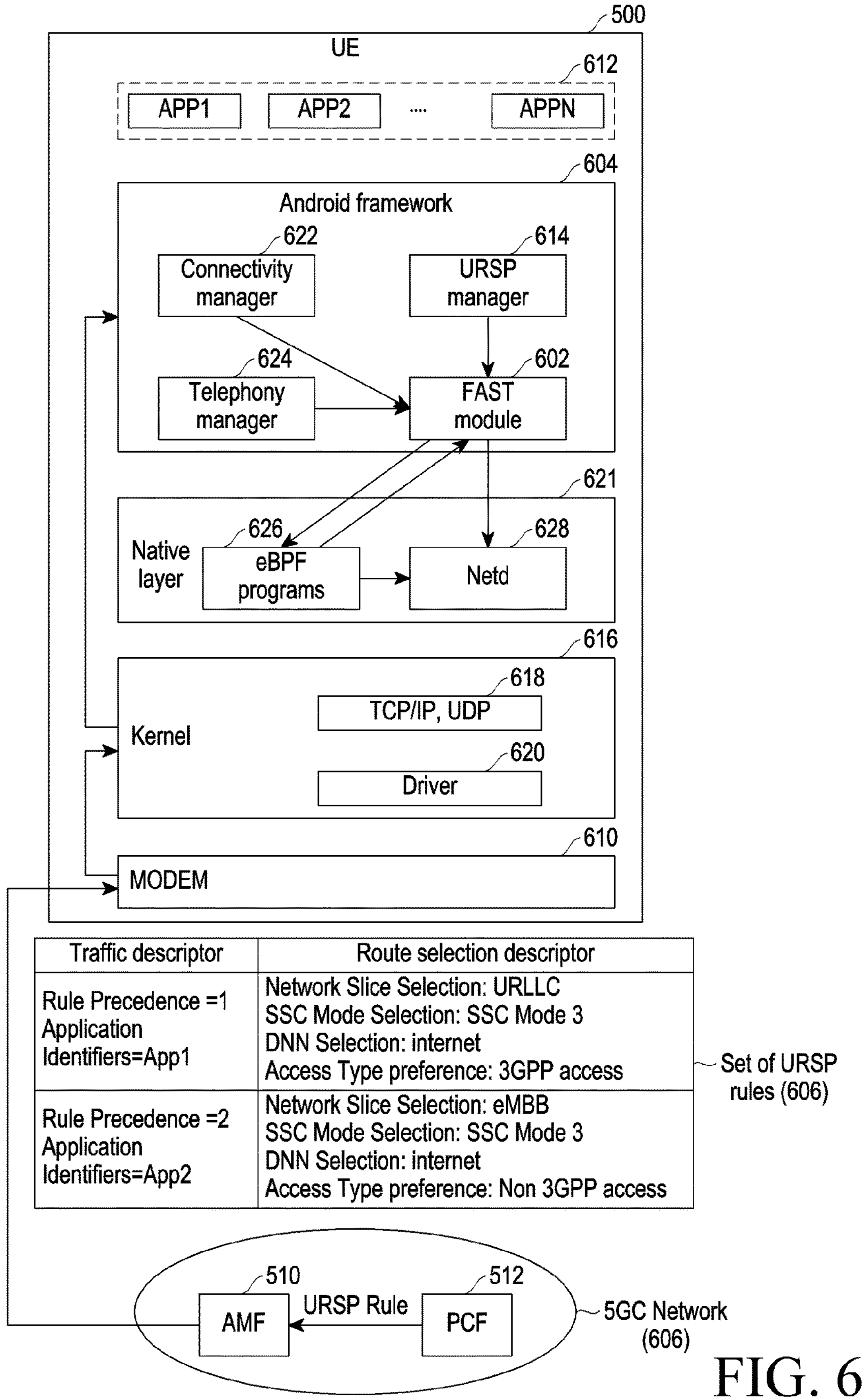

| Traffic descriptor | Route selection descriptor |
|---|---|
| Rule Precedence =1<br>Application Identifiers=App1 | Network Slice Selection: URLLC<br>SSC Mode Selection: SSC Mode 3<br>DNN Selection: internet<br>Access Type preference: 3GPP access |
| Rule Precedence =2<br>Application Identifiers=App2 | Network Slice Selection: eMBB<br>SSC Mode Selection: SSC Mode 3<br>DNN Selection: internet<br>Access Type preference: Non 3GPP access |

FIG. 6

METHOD AND APPARATUS FOR TUNING SYSTEM PARAMETERS FOR ONE OR MORE NETWORK SLICES

CROSS-REFERENCE TO RELATED APPLICATIONS

This application is a continuation of International Application No. PCT/KR2023/008962 designating the United States, filed on Jun. 27, 2023, in the Korean Intellectual Property Receiving Office and claiming priority to Indian Provisional Patent Application No. 2022410038700, filed on Jul. 5, 2022, in the Indian Patent Office, and to Indian Complete Patent Application No. 2022410038700, filed on Jun. 9, 2023, in the Indian Patent Office, the disclosures of each of which are incorporated by reference herein in their entireties.

BACKGROUND

Field

The disclosure relates to the field of wireless communication networks, and for example, relates to a system and a method for tuning system parameters for one or more network slices.

Description of Related Art

With the advancements in wireless technology and communication systems, the demand for wireless data traffic has increased since deployment of 4th-generation (4G) communication systems. To meet such demand for wireless data traffic, efforts have been made to develop an improved 5th-generation (5G) or pre-5G communication system. Therefore, the 5G or pre-5G communication system is also called a 'beyond 4G network' or a 'post-long-term evolution (LTE) system'.

5G is developed to provide higher bandwidth, lower End-to-End (E2E) latency, and more flexible and reliable network access. For example, 5G is configured to support stable network connection for high-end user devices and high-density distributed sensors, which are necessary for Internet of Things (IoT) based applications. In addition to these features, 5G provides customized services to the users in terms of specific requirements for different verticals, such as manufacturing, automotive, health-care industries, and the like. To provide the above-mentioned services, the concept of network slicing is adopted in 5G. The core idea beneath 5G is to divide a single physical network into multiple E2E logically separated sub-networks, each of which is called a Network Slice (NS). Specifically, every NS owns a management domain and an E2E logical topology. Operators can flexibly create, modify, or delete the NS as per different Quality of Service (QoS) requirements without disrupting other existing NS.

An example block diagram depicting a system environment including a deployment of the NS is shown in FIG. 1, in accordance with an existing art. As depicted in FIG. 1, an NS deployment includes a User Equipment (UE) 102, a Next-Generation Radio Access Network (NG-RAN) 104, a control plane, a user plane, and a data network 106. For example, the control plane may include Access and Mobility Management Function (AMF), Policy Control Function (PCF), Session Management Function (SMF), and the like. For example, the user plane may include User Plane Function (UPF). As depicted, 108 represents Single-Network Slice Selection Assistance Information (S-NSSAI) #1 and S-NSSAI #2 (Enhanced Mobile Broadband (eMBB) slice and Ultra-Reliable Low Latency Communications (URLLC) slice). Further, 110 represents the S-NSSAI #1 e.g., the URLLC slice and 112 represents the S-NSSAI #2 e.g., the eMBB slice. Further, the data network may be the internet.

Further, each NS is identified by the S-NSSAI which includes a Slice Service Type (SST) for identifying a service for which the NS is suitable. A network operator can use either standardized SST values (e.g., 1 for enhanced mobile broadband, 2 for ultra-reliable low latency communications, 3 for massive IoT, 4 for V2X, and 5 for High-performance machine type communications) or non-standardized SST values that can be locally defined. The UE is configured with a set of User Equipment Route Selection (URSP) rules 114 that allows the UE 102 to select the S-NSSAI. The S-NSSAI is selected based on the application that the UE is required to use based on or more parameters, such as QoS requirements of the application. The UE has two Protocol Data Unit (PDU) sessions, where one is established via the S-NSSAI #1 (URLLC slice) towards the Data Network Name (DNN) of the internet while the other is established via the S-NSSAI #2 (eMBB slice) towards the same DNN. When the UE is required to send traffic of App1, the UE finds the matching traffic descriptor in the URSP rule and selects the PDU session according to the corresponding route selection descriptor (e.g., PDU session of S-NSSAI #1 and DNN of the internet).

FIG. 2 is a block diagram of End-to-End network slice architecture depicting components of android networking stack, in accordance with an existing art. The android networking stack is involved in flow of data packets from an application to a Network Interface Card (NIC) and from the NIC to the application. As depicted, a Content Delivery Network (CDN) 1 202 is communicatively coupled to the eMBB slice 204, CDN 2 206 is communicatively coupled to the URLLC slice 208, and CDN N 210 is communicatively coupled to an IoT slice 212. Further, each of the eMBB slice 204, the URLLC slice 208, and the IoT slice 212 is part of a 5G core network (5GC) 214 and is communicatively coupled to the NG-RAN 216. The NG-RAN 216 includes one or more gNodeB (gNB) 218, as shown in FIG. 2. Further, the UE 220 includes an application 1 222, an application 2 224, . . . application N 226. Furthermore, for achieving diverse QoS requirements through the network slicing, the network infrastructure is sliced into isolated logical networks which are dedicated to different types of traffic including latency-sensitive, throughput oriented, and the like. Further, components of the android networking stack are involved in the flow of data packets from the application to the NIC and from the NIC to the application. However, these components of the android networking stack are not well-tuned for all use cases, as shown as an example in FIG. 2. There is no slice-specific method that exists in UEs to tune the kernel parameters which comprises of both throughput enhancement parameters and latency improvement parameters. Thus, it can lead to increased latency for the URLLC slice and lesser throughput for the eMBB slice.

FIGS. 3A and 3B illustrate working of the components associated with the android networking stack for the flow of data packets, in accordance with the existing art.

Further, a current working example of components associated with the android networking stack for the flow of data packets flow is shown with the help of FIGS. 3A and 3B of the drawings, in accordance with an existing state of the art. The data packets flow from the application to the NIC and from the NIC to the application. In particular, FIG. 3A is a sequential flow diagram depicting the path of data packet traversal in user equipment (UE) for both incoming and outgoing data packets. At step 1, the data packets are received by the NIC. Further, at step 2, the NIC writes the data in the data packets to RAM. At step 3, the NIC sends an interrupt to the driver. At step 4, a Central Processing Unit (CPU) core receives the data packets. At step 5, the CPU processes the received data packets. At step 6, the ring buffer sends the data packets to an Internet Protocol (IP) protocol. At step 7, the IP layer sends the data packets to a netfilter. At step 8, the netfilter sends the data packets to a backlog queue. At step 9, the backlog queue sends the data packets to a transport layer. Furthermore, at step 10, the transport layer sends the data packets to a socket buffer. At step 11, the socket buffer sends the data packets to an application installed in the UE. Similarly, steps 12 through 22 of the right-hand side of FIG. 3A depict a sequence flow for the outgoing data packets. Further, in particular, FIG. 3B depicts a set of layers, such as an Application (APP) layer 302, a transport layer 304, the IP layer 306, the link layer 308, and a physical layer 310, along with application buffers 312.

Further, the current implementation assigns the static values for 5G without considering one or more scenarios in mmwave bands, such as blockage problem (e.g., the phenomena that the signal cannot pass through An obstacle owing to the directivity and the receiving Signal-to-Noise Ratio (SNR) value is severed), highly variable channel causing channel fluctuations (e.g., frequent line of sight to non-line of sight transitions), and the like. Under these scenarios, values associated with the kernel parameters are required to be tuned based on new network conditions. Furthermore, tuning the android networking stack based on Radio Access Technology (RAT) is not an efficient method for a given RAT, when a signal condition is not good or under high packet loss conditions, bigger values lead to poor performance. For example, a web page fails to load even if there is enough bandwidth to load the web page.

In general, in the 5GC network 402, Point Coordination Function (PCF) 404 sends a set of URSP rules to Access and Mobility Management Function (AMF) 406. Further, the 5GC network 402 transmits the set of URSP rules to the UE 408, and the UE 408 may apply the set of URSP rules with default kernel parameter values for all slices resulting in increased latency for the URLLC slice and lesser throughput for the eMBB slice. An example communication system depicting an application of User Equipment Route Selection (URSP) rules by the UE 408 is shown in FIG. 4, in accordance with an existing state of the art.

Conventionally, huge values are set for the kernel parameters to prioritize Throughput (TP) traffic. This may result in a significant increase in UE stack latency (USL) which affects latency-sensitive traffic of slices, such as the URLLC slice. The USL corresponds to time taken by packet traversal in UE stack. In other example, if static values are assigned without considering network conditions for 5G RAT then this may lead to poor performance under bad network conditions for throughput-oriented traffic of slices, such as the eMBB slice. Further, URLLC Protocol Data Unit (PDU) sessions involve shorter data transfers. Therefore, its buffers (rmem,wmem) cannot reach peak values quickly and it is difficult to compete with bulk traffic once URLLC traffic crosses the 5G RAN. Hence, boosting connection speed from the beginning of the session is required for URLLC. For example, a bigger initial congestion window (INIT_CWND). Also, during parallel ongoing PDU sessions for each of the URLLC slice and the eMBB slice, the URLLC traffic required to be processed immediately is queued as cores of the CPU are busy servicing interrupts for bulk traffic of eMBB and processing it. In yet another example corresponding to the LTE, the USL is not significant compared to network latency which typically ranges from about 30 ms to 150 ms. However, most of the use cases for 5G, such as cloud gaming, Augmented reality/Virtual reality (AR/VR) demand latencies to be as low as 10 ms. Hence, the USL is comparable to network latency and is required to be optimized.

Thus, it is desired to address the above-mentioned disadvantages or shortcomings or at least provide a useful alternative for tuning system parameters for one or more network slices.

SUMMARY

According to an example embodiment of the present disclosure, a method implemented for tuning system parameters for one or more network slices by a user equipment (UE) is disclosed. The method includes receiving, from a network, a set of user equipment route selection (URSP) rules including slice-specific information for each of the one or more network slices. Further, the method includes determining an application user ID (UID) associated with the one or more network slices based on the slice-specific information included in the received URSP rules. The method includes acquiring, from one or more applications running on the UE, packet information related to each of one or more ongoing protocol data unit (PDU) sessions associated with a corresponding network slice of the one or more network slices based on the received set of URSP rules and the determined application UID. Furthermore, the method includes obtaining a flow rate for each of the one or more ongoing PDU sessions based on the received set of URSP rules, the determined application UID, and the acquired packet information related to each of one or more ongoing PDU sessions associated with the corresponding network slice. The method includes tuning the set of system parameters for the one or more ongoing PDU sessions based on the obtained flow rate and a threshold flow rate. Further, the method includes applying, based on the tuned set of system parameters, one or more policies for the one or more ongoing PDU sessions.

According to an example embodiment of the present disclosure, a user equipment (UE) for tuning system parameters for one or more network slices is disclosed. The UE includes: a memory and one or more processors communicatively coupled to the memory. Further, the one or more processors are configured to receive, from a network, a set of user equipment route selection (URSP) rules including slice-specific information for each of the one or more network slices. Further, the one or more processors are configured to determine an application user ID (UID) associated with the one or more network slices based on slice-specific information included in the received URSP rules. The one or more processors are configured to acquire, from one or more applications running on the UE, packet information related to each of one or more ongoing protocol data unit (PDU) sessions associated with a corresponding network slice of the one or more network slices based on the received set of URSP rules and the determined application UID. Furthermore, the one or more processors are configured to obtain a flow rate for each of the one or more ongoing PDU sessions based on the received set of URSP rules, the determined application UID, and the acquired packet information related to each of one or more ongoing PDU sessions associated with the corresponding network slice. The one or more processors are configured to tune the set of system parameters for the one or more ongoing PDU sessions based on the obtained flow rate and a threshold flow rate. Further, the one or more processors are configured to apply, based on the tuned set of system parameters, one or more policies for the one or more ongoing PDU sessions.

A more detailed description of the various example embodiments will be provided below with reference to the appended drawings. It is appreciated that these drawings depict example embodiments of the disclosure and are therefore not to be considered limiting of its scope. The disclosure will be described and explained with additional specificity and detail with the accompanying drawings.

BRIEF DESCRIPTION OF THE DRAWINGS

The above and other features, aspects, and advantages of certain embodiments of the present disclosure will be more apparent from the following detailed description, taken in conjunction with the accompanying drawings in which like characters represent like parts throughout the drawings, and in which:

FIG. 6 is a block diagram illustrating a set of system parameters, according to various embodiments;

Figure 1:
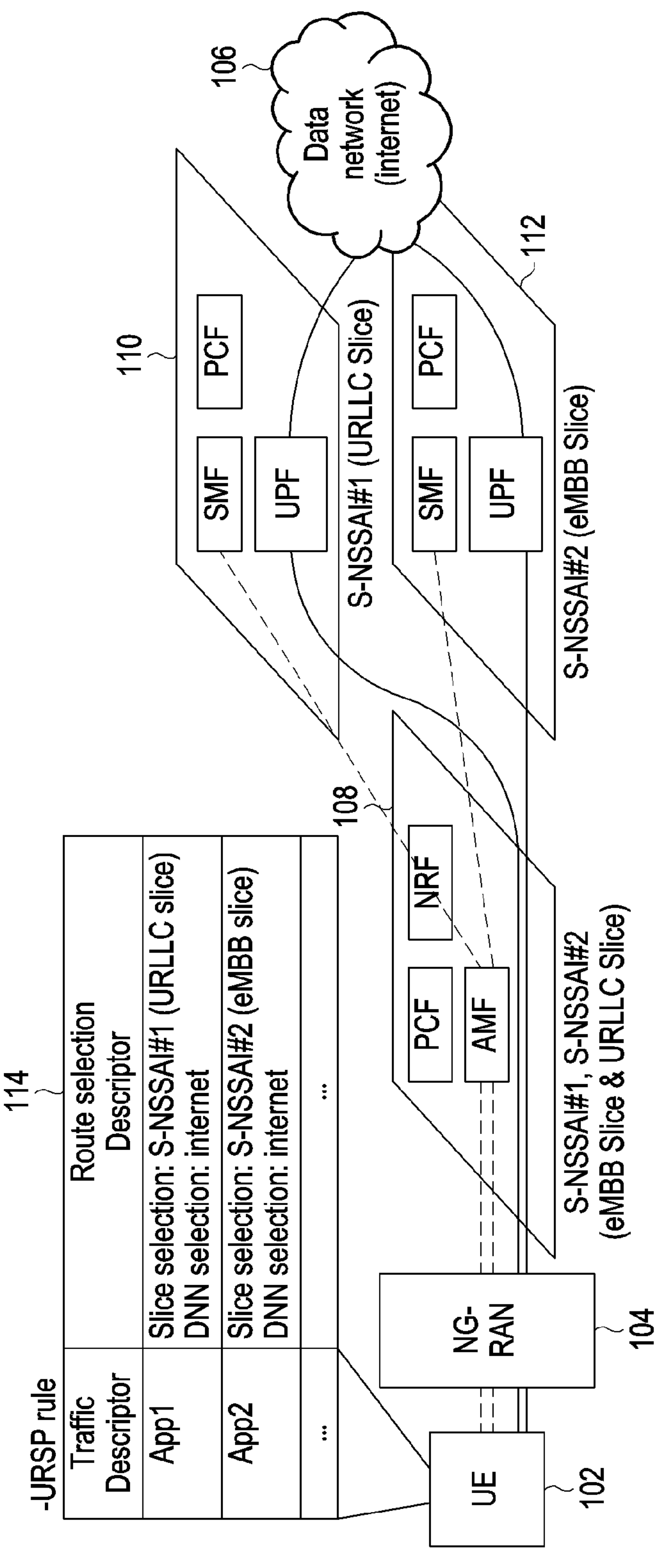
FIG. 1 (RELATED ART)
FIG. 1 is a block diagram depicting a deployment of a Network Slice (NS), in accordance with the existing art.
Figure 2:
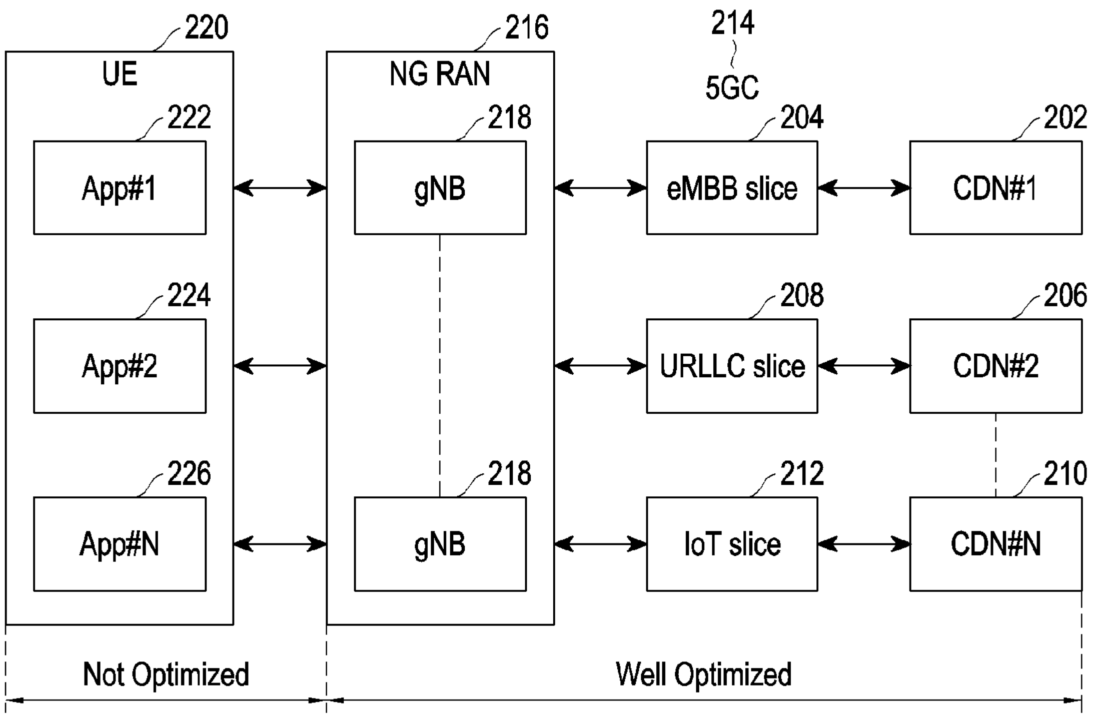
FIG. 2 (RELATED ART)
FIG. 2 is a block diagram of End-to-End network slice architecture depicting components of an android networking stack, in accordance with the existing art.
Figure 3A:
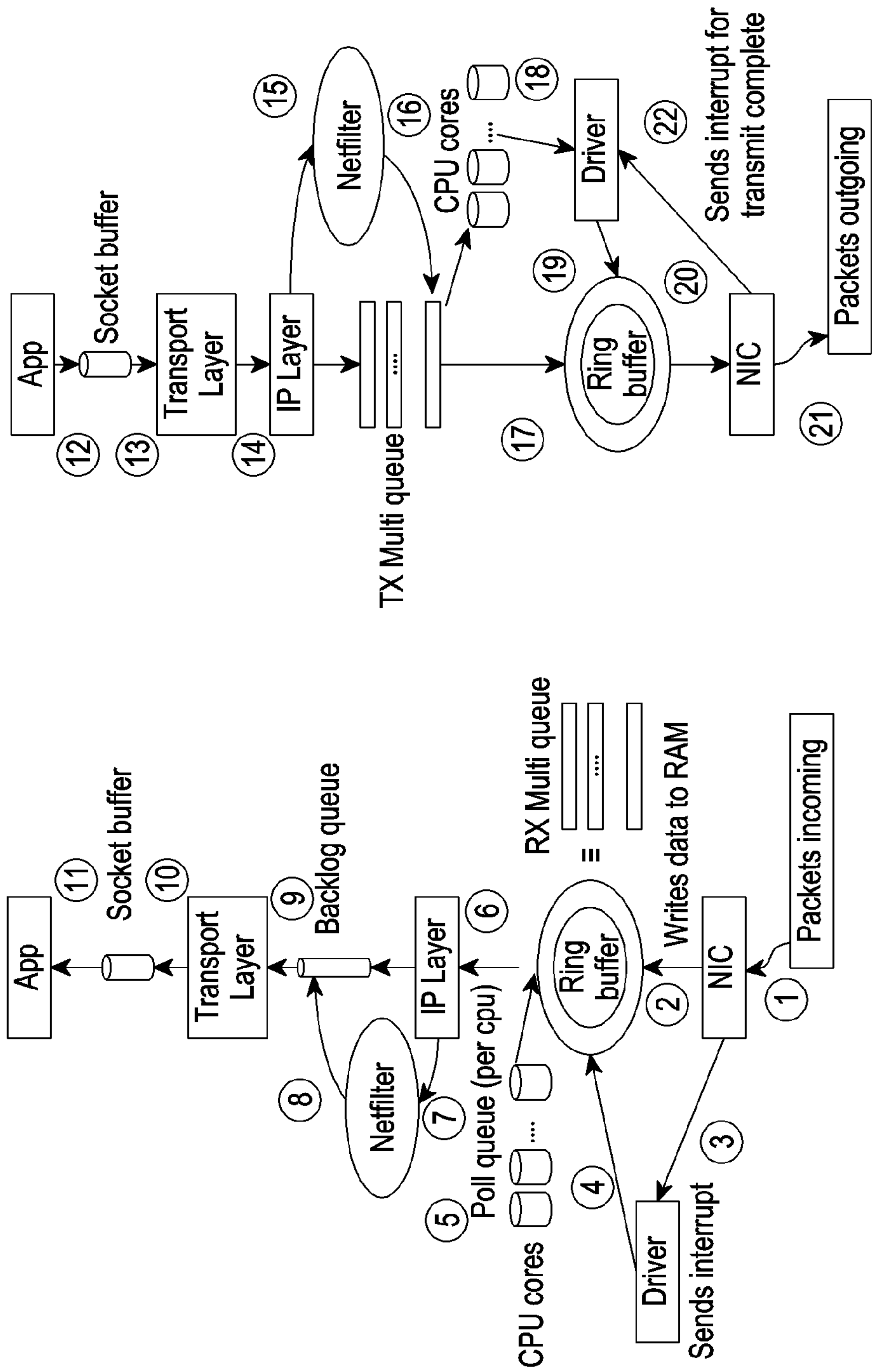
FIG. 3A (RELATED ART)
FIGS. 3A and 3B illustrate the working of the components associated with the android networking stack for flow of data packets, in accordance with the existing art.
Figure 3B:
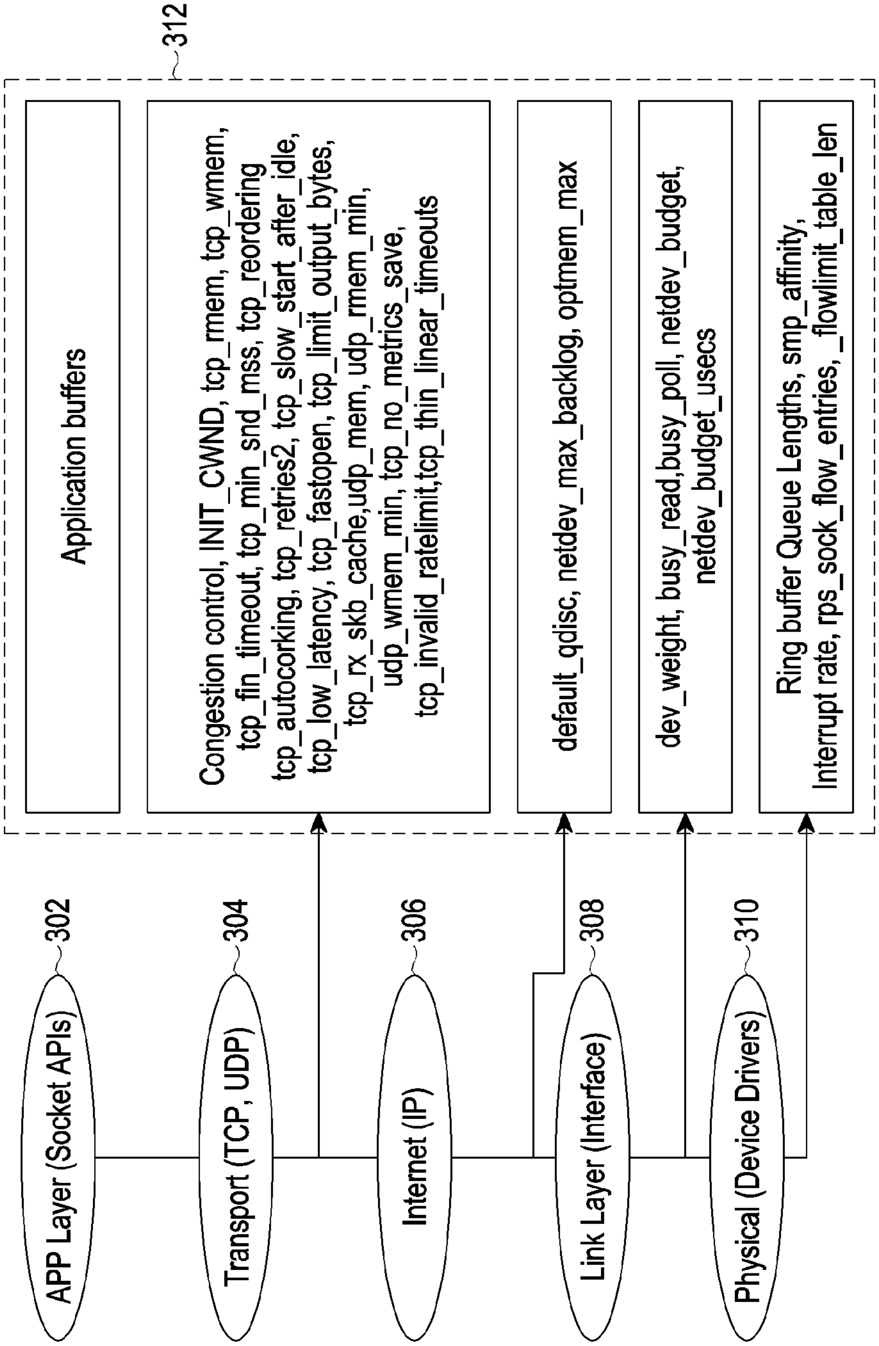
FIG. 3B (RELATED ART)
Figure 4:
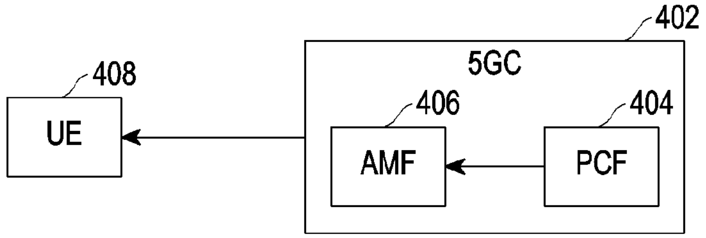
FIG. 4 (RELATED ART)
FIG. 4 is a block diagram depicting an application of User Equipment Route Selection (URSP) rules by a User Equipment (UE), in accordance with the existing state of the art.

Further, skilled artisans will appreciate that elements in the drawings are illustrated for simplicity and may not have necessarily been drawn to scale. For example, the flowcharts illustrate the method in terms of operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that may be readily apparent to those of ordinary skill in the art having the benefit of the description herein.

DETAILED DESCRIPTION

Reference will now be made to the various example embodiments and specific language will be used to describe the same. It will nevertheless be understood that no limitation of the scope of the disclosure or claims is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the present disclosure. Thus, appearances of the phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Figure 5:
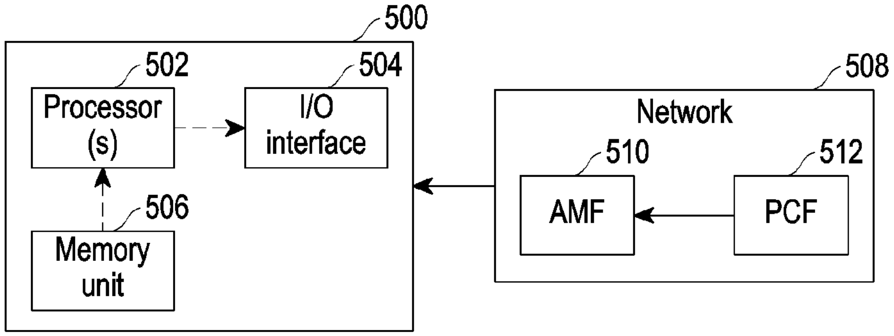
FIG. 5 is a block diagram illustrating an example configuration of the UE for tuning system parameters for one or more network slices, according to various embodiments.

FIG. 5 is a block diagram illustrating an example configuration of a User Equipment (UE) 500 for tuning system parameters for one or more network slices, according to various embodiments. In an embodiment of the present disclosure, the UE 500 may use a Flow Aware Stack Tuner (FAST) module for tuning a set of system parameters for the one or more network slices. The FAST module is described in greater detail below with reference to FIGS. 6 and 7.

In an embodiment of the present disclosure, the set of system parameters corresponds to a set of kernel parameters.

For example, the set of kernel parameters corresponds to one or more Transmission Control Protocol/Internet Protocol (TCP/IP) parameters, one or more driver layer parameters, or a combination thereof. The TCP/IP parameters and the one or more driver layer parameters are shown in Table 1 and Table 2. The configuration of FIG. 5 may be understood as a part of the configuration of the UE 500. Hereinafter, it is understood that terms including "unit" or "module" at the end may refer to the unit for processing at least one function or operation and may be implemented in hardware, software, or a combination of hardware and software.

TABLE 1

| Parameter | Tuned Value | Objective(s) |
|---|---|---|
| smp__affinity | To map an interrupt corresponding to the app to a CPU core | Faster processing of an app traffic corresponding to URLLC |
| Rx and Tx QueueLength | Lesser length for URLLC and a bigger length for eMBB | For Faster processing of URLLC traffic and to enqueue a higher number of packets of eMBB traffic without drops |
| GRO and tcp__auto__corking | Disable URLLC and enable it for eMBB | To forward packets faster up the stack without coalescing for URLLC and enhance throughput for eMBB |
| Tcp__rmem Tcp__wmem | Lesser value for URLLC and a higher for eMBB | To reduce application delay, avoid buffer bloat for URLLC apps, and increase throughput for eMBB slice |
| Congestion control | Configure low latency, delay-based CC for URLLC and Loss based/aggressive CC for eMBB | To get better upload throughput for both URLLC and eMBB traffic |
| Netdev__budget | A higher value for eMBB, relatively less for URLLC | To avoid NIC buffer overflow |
| busy__poll | Set to a non-zero value for URLLC to poll for new data | For immediate processing of latency traffic |
| INIT__CWND | Relatively bigger value for URLLC, the Default value for eMBB | To boost connection speed from the beginning of the connection |
| Netdev__max backlog | Lesser length for URLLC and a bigger length for eMBB | To reduce queuing delay for URLLC and enqueue a higher number of packets of eMBB traffic without a drop |
| RPS, xps cpus | Enable and assign each Tx, Rx queues to a dedicated CPU core | To avoid blocking of processing URLLC traffic from eMBB traffic and also to increase CPU cache hit rates |
| rx-usecs and tx-usecs | Lower value/High interrupt rate for URLLC and Bigger value/Less interrupt rate for eMBB | Immediate processing of URLLC traffic without CPU overhead and less CPU wakeups, high throughput for eMBB |
| dev__weight | Bigger value for eMBB, Lower value for URLLC | To let the kernel process more packets for eMBB in one shot |
| rmem max wmem max | These are socket buffer lengths. Lesser value for URLLC and a higher for eMBB | To reduce application delay, avoid buffer bloat for URLLC apps, and increase throughput for eMBB slice |

TABLE 2

| Parameter | Tuned Value |
|---|---|
| tcp__no__metrics__save | 1, to avoid mixing of one slice metrics with another slice |
| tcp__low__latency | 1, when URLLC session is going on to let kernel give more preference to latency traffic |
| tcp__fastopen | 3 for URLLC & eMBB to avoid delay by sending/accepting data from the initial syn itself |
| tcp__fin__timeout | to 10 secs from default 60 secs to abort orphaned connections early to avoid further wastage of device resources |
| tcp__min__snd__mss | 1000 from default 48 to avoid throughput limitation in case of misconfiguration |
| tcp__reordering | 10 from default 3 to allow the kernel to do more reorderings before going to a slow start. This is to address volatile 5G network conditions. |

TABLE 2-continued

| Parameter | Tuned Value |
|---|---|
| tcp_thin_linear_timeouts | 1, for URLLC to postpone exponential backoff mode upto 6 retransmission timeouts for URLLC thin streams |
| optmem_max | 100 Kb from default 20 Kb, to accommodate more memory for eBPF programs and maps |
| tcp_slow_start_after_idle | 0 from 1, to avoid falling back to a slow start and keeps CWND large with keep-alive connections |
| tcp_limit_output_bytes | Lesser value for URLLC to reduce buffering in android stack, Higher value for eMBB |
| udp_mem, udp_rmem min, udp_wmem_min | Dynamic tuning of this value to manage UDP socket buffers during RAM outage |
| tcp_invalid_ratelimit | 100 ms from default 500 ms to avoid throughput drop due to delayed acknowledgments during out-of-window sequences or acknowledgment numbers |

In an embodiment of the present disclosure, each of the one or more network slices represents an independent virtualized instance defined by the allocation of a subset of available network resources. For example, the one or more network slices may be an Enhanced Mobile Broadband (eMBB) slice, an Ultra-Reliable Low Latency Communications (URLLC) slice, an Internet of Things (IoT) slice, and the like.

Referring to FIG. 5, the UE 500 may include one or more processors (e.g., including processing circuitry) 502, an Input/Output (I/O) interface (e.g., including circuitry) 504 (e.g., communicator or communication interface), and a memory unit 506 (e.g., memory). In an example embodiment of the present disclosure, the UE 500 may correspond to a smartphone, a laptop computer, a desktop computer, a wearable device, and the like. The I/O interface 504 may perform functions for transmitting and receiving signals via a wireless channel.

As an example, the one or more processors 502 may be a single processing unit or a number of units, all of which could include multiple computing units. The one or more processors 502 may be implemented as one or more microprocessors, microcomputers, microcontrollers, digital signal processors, central processing units, state machines, logic circuitries, and/or any devices that manipulate signals based on operational instructions. Among other capabilities, the one or more processors 502 are configured to fetch and execute computer-readable instructions and data stored in the memory. The one or more processors 502 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU). The one or more processors 502 may control the processing of the input data in accordance with a predefined operating rule or Artificial Intelligence (AI) model stored in the non-volatile memory and the volatile memory, e.g., memory unit 506. The predefined operating rule or the AI model is provided through training or learning.

The memory unit 506 may include any non-transitory computer-readable medium known in the art including, for example, volatile memory, such as static Random-Access memory (SRAM) and dynamic random access memory (DRAM), and/or non-volatile memory, such as read-only memory (ROM), erasable programmable ROM, flash memories, hard disks, optical disks, and magnetic tapes.

Various example embodiments disclosed herein may be implemented using processing circuitry. For example, some example embodiments disclosed herein may be implemented using at least one software program running on at least one hardware device and performing network management functions to control the elements.

In an embodiment of the present disclosure, the one or more processors 502 include, for example, and without limitation, a Communication Processor (CP) and an Application Processor (AP). For example, the CP is like a modem. The CP is configured to handle Layer 2 and other protocols. In an embodiment of the present disclosure, the AP is associated with upper layers, such as the network layer, transport layer, and application layer.

Further, the one or more processors 502 may be disposed in communication with one or more I/O devices via the I/O interface 504. The I/O interface 504 may employ communication code-division multiple access (CDMA), high-speed packet access (HSPA+), global system for mobile communications (GSM), long-term evolution (LTE), WiMax, or the like, etc.

Using the I/O interface 504, the UE 500 may include various circuitry and communicate with one or more I/O devices, specifically, the user devices associated with human-to-human conversation. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The one or more processors 502 may be disposed in communication with a communication network via a network interface. In an embodiment, the network interface may be the I/O interface 504. The network interface may connect to the communication network to enable the connection of the UE 500 with the outside environment. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, and the like.

In an embodiment of the present disclosure, the UE 500 is communicatively coupled to a network 508 for receiving a set of User Equipment Route Selection (URSP) rules from the network, as shown in FIG. 5. For example, the network may be one of a plurality of cellular networks (such as a 3G, 4G, a 5G or pre-5G, 6G network, or any future wireless communication network). The network 508 includes an Access and Mobility Management Function (AMF) 510 and Policy Control Function (PCF) 512. The PCF 512 sends the set of URSP rules to the AMF 510. Further, the one or more processors 502 of the UE 500 may be configured to receive the set of URSP rules including slice-specific information for each of the one or more network slices. The UE receives the set of URSP rules from the AMF 510. In an embodiment of the present disclosure, the set of URSP rules includes a traffic descriptor and a route selection descriptor. Further, the traffic descriptor includes a rule precedence and an application identifier. In an example embodiment of the present disclosure, the route selection descriptor includes a network slice selection, a Session and Service Continuity (SSC) mode, a Data Network Name (DNN) selection, an access type preference, and the like.

In various embodiments, the FAST module may be included within the memory. The FAST module may include a set of instructions that may be executed to cause the one or more processors 502 of the UE 500 to perform any one or more of the methods/processes disclosed herein. The FAST module may be configured to perform the steps of the present disclosure using the data stored in the database for tuning system parameters for one or more network slices, as discussed herein. In an embodiment, the FAST module may be a hardware unit that may be outside the memory. Further, the memory may include an operating system for performing one or more tasks of the UE 500, as performed by a generic operating system in the communications domain.

Further, the one or more processors 502 may be configured to determine an application User ID (UID) associated with the one or more network slices based on the slice-specific information included in the received URSP rules.

Furthermore, the one or more processors 502 may be configured to acquire, from one or more applications running on the UE 500, packet information related to each of one or more ongoing Protocol Data Unit (PDU) sessions associated with a corresponding network slice of the one or more network slices based on the received set of URSP rules and the determined application UID.

The one or more processors 502 may be configured to calculate a flowrate for each of the one or more ongoing PDU sessions based on the received set of URSP rules, the determined application UID, and the acquired packet information related to each of one or more ongoing PDU sessions associated with the corresponding network slice. In an example embodiment of the present disclosure, the packet information includes information associated with a source Internet Protocol (IP), a source port, a destination IP, a destination port, a protocol, a packet length, and the like. The calculating the flow rate for each of the one or more ongoing PDU sessions will be described in greater detail below with reference to FIG. 6.

Furthermore, the one or more processors 502 may be configured to dynamically tune the set of system parameters for each of the one or more ongoing PDU sessions associated with the corresponding network slice based on the calculated flow rate and a predefined threshold flow rate. For dynamically tuning the set of system parameters for each of the one or more ongoing PDU sessions, the one or more processors 502 are configured to obtain one or more RAT characteristics from a Modulator-Demodulator (MODEM) upon calculating the flow rate. In an example embodiment of the present disclosure, the one or more RAT characteristics may include Received Signal Strength Indicator (RSSI), Reference Signal Received Power (RSRP), Reference Signal Received Quality (RSRQ), New Radio (NR), and Long-Term Evolution (LTE) bands, bandwidth availability, and the like. Further, the one or more processors 502 may be configured to dynamically update/tune the one or more policies for each of the one or more ongoing PDU sessions based on the calculated flow rate, the predefined threshold flow rate, and the obtained one or more RAT characteristics. In an embodiment of the present disclosure, the one or more policies include a throughput enhancement policy, latency reduction policy, default policy, and the like. The dynamically updating/tuning the one or more policies will be described in greater detail below with reference to FIGS. 9A, 9B and 9C.

The one or more processors 502 may be configured to apply, based on the dynamically tuned set of system parameters, one or more policies for each of the one or more ongoing PDU sessions associated with the corresponding network slice.

For applying the one or more policies, the one or more processors 502 may be configured to determine whether one or more socket options are available for each of the one or more policies. Further, the one or more processors 502 may be configured to configure the one or more socket options via one or more Extended Berkeley Packet Filters (eBPFs) upon the determination that the one or more socket options are available for each of the one or more policies. The one or more processors 502 may be configured to apply the one or more policies for each of the one or more ongoing PDU sessions associated with the corresponding network slice based on the configured one or more socket options.

Further, for applying the one or more policies, the one or more processors 502 may be configured to configure the set of system parameters via a network interface upon the determination that the one or more socket options are unavailable for each of the one or more policies. In an embodiment of the present disclosure, the set of system parameters is unique to the network slice (eMBB, URLLC, and the like) to give the best experience for each PDU session associated with each network slice. The one or more processors 502 may be configured to apply the one or more policies for each of the one or more ongoing PDU sessions associated with the corresponding network slice based on the configured set of system parameters. The configuring the set of system parameters will be described in greater detail below with reference to FIG. 6.

Furthermore, the one or more processors 502 may be configured to obtain one or more statistics for the one or more ongoing PDU sessions from a set of layers of a Kernel via one or more eBPFs. In an embodiment of the present disclosure, the one or more statistics are related to packet drops and error rates. The one or more processors 502 may be configured to generate one or more static values for the set of system parameters based on the obtained one or more statistics. Further, the one or more processors 502 may be configured to dynamically update the set of system parameters for each of the one or more ongoing PDU sessions via one of a netd sysctl interface and the one or more eBPFs based on the generated one or more static values. In an embodiment of the present disclosure, the one or more static values for the set of system parameters are shown in Table 1 and Table 2. In an embodiment of the present disclosure, the one or more static values are determined based on the one or more statistics available at different layers of the kernel, as shown in table 3.

TABLE 3

| Statistic Path | Layer |
|---|---|
| /sys/class/net/rmnetX/statistics/ | 5G Interface |
| /sys/class/net/wlan0/statistics/ | WiFi Interface |
| /proc/net/softnet stat | CPU |
| /proc/net/snmp | IP protocol |
| /proc/net/netstat | IP Layer |
| /proc/net/udp | UDP |
| /proc/net/dev | NIC |

Further, the one or more processors 502 may be configured to determine whether there is a performance degradation in the one or more ongoing PDU sessions based on the obtained one or more statistics. The one or more processors 502 may also be configured to determine whether there is a change in one or more Radio Access Technology (RAT) characteristics, the flow rate, or a combination thereof upon determining that there is a performance degradation in the one or more ongoing PDU sessions. Furthermore, the one or more processors 502 may be configured to dynamically tune the set of system parameters for each of the one or more ongoing PDU sessions associated with the corresponding network slice to one or more new values based on the flow rate and the predefined threshold flow rate upon determining a change in at least one of the one or more RAT characteristics or the flow rate.

The one or more processors 502 may be configured to identify a foreground application running on the UE 500. Further, the one or more processors 502 may be configured to determine a type of the identified foreground application. The one or more processors 502 may be configured to load the one or more policies for each of the one or more ongoing PDU sessions based on the determined type of the identified foreground application.

Further, the one or more processors 502 may be configured to dynamically create and tune the one or more policies for each of the one or more ongoing PDU sessions associated with the corresponding network slice based on the calculated flow rate and the predefined threshold flow rate. In an embodiment of the present disclosure, the dynamic creation and tuning of the one or more policies based on the slice-specific information and the flow rate per each PDU session per slice provides a better user experience for latency and throughput-oriented applications. In an embodiment of the present disclosure, dynamic tuning of policies to adapt to volatile 5G network conditions by constant monitoring Radio Access Technologies (RAT). For example, RAT may correspond to 5G/LTE, Wi-Fi/Wi-Fi 6E characteristics, such as RSSI, RSRP, RSRQ, NR and LTE bands, bandwidth availability, and the like. The dynamically creating the one or more policies for each of the one or more ongoing PDU sessions will be described in greater detail below with reference to FIGS. 8A and 8B.

The comparison of the FAST module with conventional modules will be described in greater detail below with reference to FIGS. 10A, 10B, and 11.

In a use case scenario, the UE 500 receives an URSP rule (URLLC, 3rd Generation Partnership Project (3GPP) Access, APP1) from the network 508 e.g., the 5GC. The network 508 requested the URLLC slice for APP1=Bixby. Without the present disclosure, the performance of the Bixby app may be degraded as the UE 500 tuned android stack to high values to prefer only bulk traffic. However, the present disclosure tunes an android stack to prefer latency traffic and ensures faster processing of data. Thus, lower latency is achieved. For example, the applications for this mode may include Bixby voice applications, chat applications, video/voice calling applications, cloud gaming applications, and the like.

In another use case scenario, the UE 500 receives a URSP rule (eMBB, 3GPP/Non-3GPP access, APP2) from the network 508. Further, the network 508 requested the eMBB slice for streaming the applications over either 3GPP or non-3GPP access. However, the RAT characteristics are not good. This may result in buffering of the video even though enough bandwidth is available to process this data. This happens due to the setting of high values to the kernel parameters in bad network conditions. The present disclosure detects bad network conditions and dynamically adjusts the kernel parameters to moderate values for high throughput. For example, the applications for this mode may include video streaming applications, Augmented Reality (AR), Virtual Reality (VR) applications, and the like.

In another use case scenario, the UE 500 receives the URSP rule (eMBB, 3GPP access, APP2) from the network 508. Further, the network 508 requested the eMBB slice for APP2. Current settings may not handle the high rate of incoming traffic and may result in packet drops. The present disclosure tunes android stack to ensure the highest throughput and handle bulk traffics. For example, the applications for this mode may include high-resolution video streaming applications, file download applications, and the like.

In another use case scenario, the UE 500 receives two URSP rules (URLLC, 3GPP Access, APP1 and eMBB, 3GPP access, APP2) from the network 508. Further, the network 508 requested for URLLC slice for APP1 and eMBB slice for APP2. The user is using both APPs. Without the present disclosure, one of the sessions needs to be compromised resulting in bad performance. The present disclosure tunes android stack, such that both the PDU sessions may receive the best Quality of Service (QoS). For example, the applications for this mode may include all low latency and throughput-oriented applications including voice, online gaming applications, streaming applications, and the like.

FIG. 6 is a block diagram for configuring the set of system parameters, according to various embodiments. As explained with respect to FIG. 5, the set of system parameters is configured via the network interface upon the determination that the one or more socket options are unavailable for each of the one or more policies.

In an embodiment of the present disclosure, the set of system parameters is configured for different network slices using a Flow Aware Stack Tuner (FAST) module 602. The FAST module 602 provides techniques for dynamic tuning of kernel parameters to improve latency and enhance the throughput of PDU sessions associated with different network slices. The FAST module 602 minimizes and/or reduces the application delay by boosting the connection speed and by improving the processing time in protocol layers of android stack. As shown in FIG. 6, FAST module 602 operates at an android framework layer 604 of the UE 500.

As depicted, the PCF 512 of the 5GC network 606 sends the set of URSP rules 608 to a UE modem 610 via the AMF 510. The UE 500 runs a set of applications 612, such as App 1, App2, . . . App N. In an embodiment of the present disclosure, the set of URSP rules 608 includes a traffic descriptor and a route selection descriptor. For example, the traffic descriptor may be rule precedence=1 and application identifier=App 1, and the route selection descriptor may be network slice selection: URLLC, SSC mode selection: SSC Mode 3, DNN selection: internet and access type preference:

3GPP access. In another example, rule precedence=2 and application identifier=App 2, and the route selection descriptor may be network slice selection: eMBB, SSC mode selection: SSC Mode 3, DNN selection: internet and access type preference: non-3GPP access. Further, the modem 610 forwards the set of URSP rules 606 to URSP manager 614 located at the android framework 604 via a kernel 616. The kernel 616 includes TCP/IP, User Datagram Protocol (UDP) 618, and driver 620. In an embodiment of the present disclosure, the FAST module 602 is communicatively coupled with eBPF programs and Netd of the native layer 621. Further, the android framework includes a telephony manager and a connectivity manager. Furthermore, the FAST module 602 receives the slice-specific information and the application UID from the URSP manager 614.

Further, the FAST module 602 fetches RAT characteristics information, such as RSSI, RSRQ, and the like from the connectivity manager 622 and the telephony manager 624. The FAST module 602 uses eBPF programs 626 to gather statistics of sockets associated with the PDU session of the network slice. In an embodiment of the present disclosure, the eBPF programs are hooked into the kernel from Netd 628. Further, the socket options for a particular PDU session are configured via the eBPF programs 626. The eBPF programs 626 configures the remaining kernel parameters which do not have socket options via android Netd module.

Figure 7:
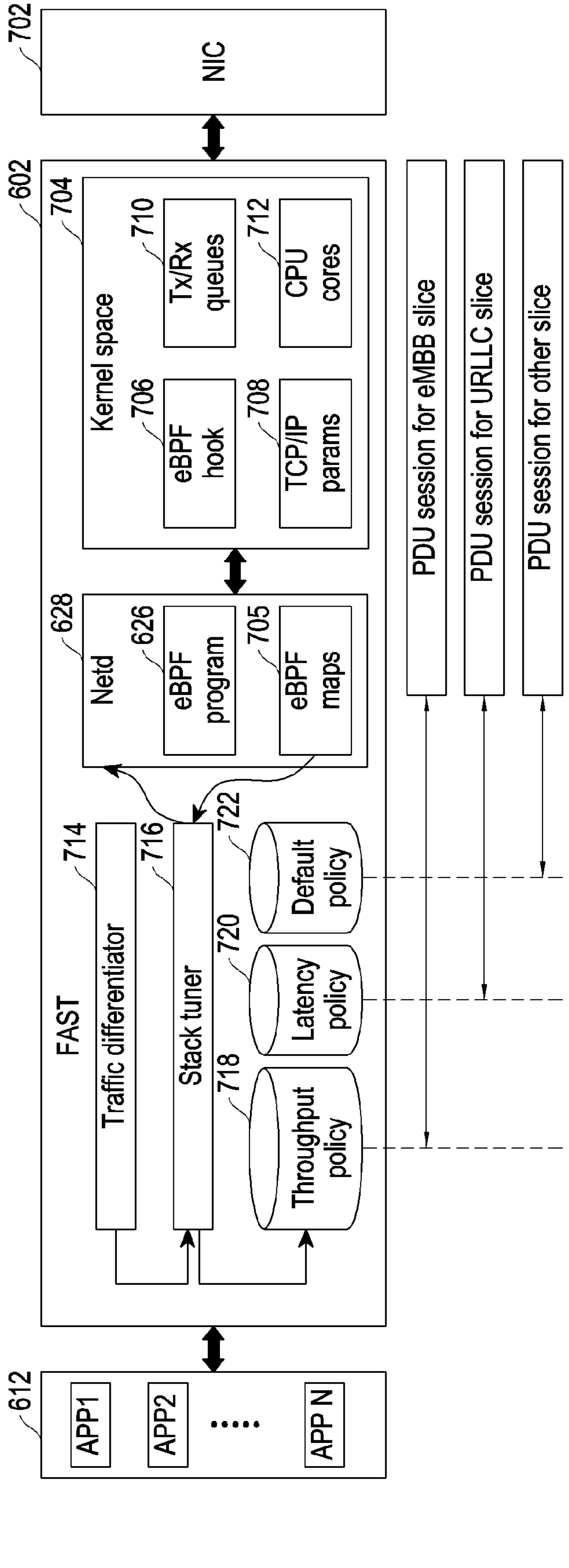
FIG. 7 is a block diagram illustrating an example calculating a flowrate for each of one or more ongoing Protocol Data Unit (PDU) sessions, according to various embodiments.

FIG. 7 is a block diagram illustrating an example of calculating a flow rate for each of one or more ongoing Protocol Data Unit (PDU) sessions, according to various embodiments. As explained with respect to FIG. 5, the flow rate for each of the one or more ongoing PDU sessions is calculated based on the set of URSP rules, the application UID, and the packet information related to each of one or more ongoing PDU sessions.

As depicted in FIG. 7, the Network Interface Card (NIC) 702 is communicatively coupled to the FAST module 602. Further, a kernel space 704 is communicatively coupled to Netd 628. The Netd includes the eBPF program 626 and eBPF maps 705. Further, the kernel space 704 includes the eBPF hook 706, TCP/IP parameters 708, transmission and receiving queues 710, and CPU cores 712. Further, the FAST module 602 includes a traffic differentiator 714, a stack tuner 716, and the one or more policies including a throughput policy 718, a latency policy 720, and a default policy 722.

Further, the traffic differentiator receives the slice-specific information from the URSP manager and classifies the traffic based on the S-NSSAI value which is part of the route selection descriptor in the set of URSP rules. In an embodiment of the present disclosure, the S-NSSAI value indicates the behavior of traffic variations of a PDU session. This gives an initial direction for configuring most of the system parameters. In an embodiment of the present disclosure, a single S-NSSAI may correspond to different applications and traffic generated for each application varies in burstiness, e.g., the same application can generate burst traffic and small amounts of data. To handle this, the traffic differentiator is configured to inspect the flowrate for each connection which is estimated as below. Further, an operation flow of the operations performed by the traffic differentiator is shown and described in greater detail below with reference to FIGS. 8A and 8B.

Figure 8A:
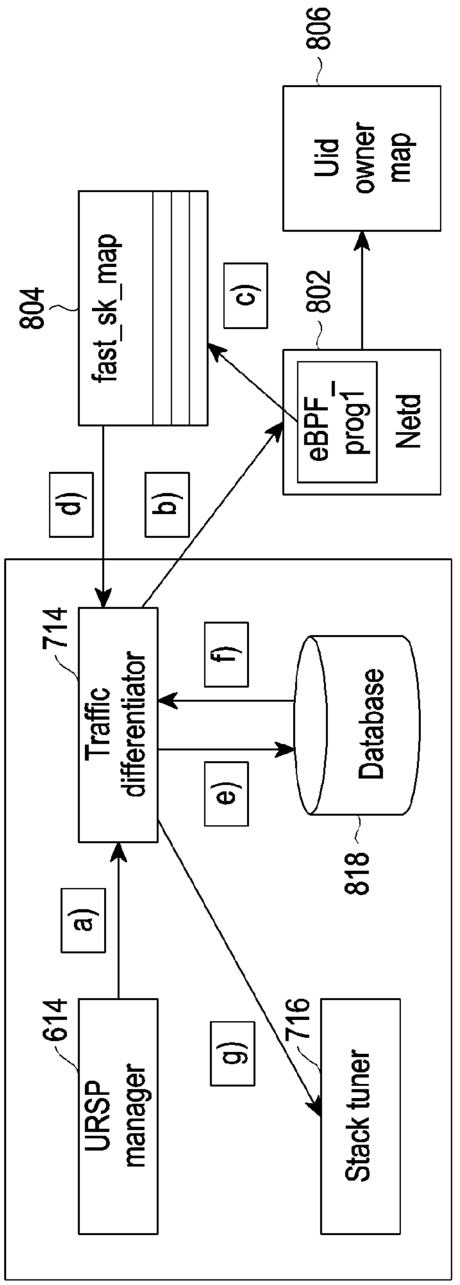
FIGS. 8A and 8B are block diagrams illustrating an example process for dynamically updating one or more policies for each of the one or more ongoing PDU sessions, according to various embodiments.
Figure 8B:
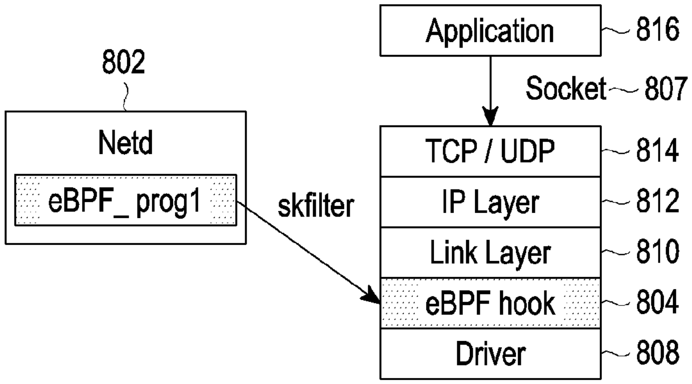

FIGS. 8A and 8B are block diagrams illustrating an example process for dynamically creating the one or more policies for each of the one or more ongoing PDU sessions, according to various embodiments. As explained with respect to FIG. 5, the one or more policies are dynamically created for each of the one or more ongoing PDU sessions associated with the corresponding network slice based on the flow rate and the predefined threshold flow rate.

At step (a), the traffic differentiator 714 is configured to read the set of URSP rules and obtain the application UID for which the network slice is requested. Further, at step (b), the traffic differentiator 714 is further configured to add the application UID to a UidOwnerMap via the Netd module. Thereafter, at step (c), the traffic differentiator 714 is further configured to run one eBPF program from the Netd layer attached to a skfliter for collecting statistics of a PDU session associated with the application UID. In an embodiment of the present disclosure, skfliter is a program type available in android eBPF. The eBPF program is shown as eBPF prog1 802 of Netd in FIG. 8B. In an embodiment of the present disclosure, the eBPF prog1 802 is connected with the eBPF hook 804 of a socket. The eBP_prog1 802 is communicatively coupled to a UID owner map 806. The socket 807 includes a driver 808, the eBPF hook 804, a link layer 810, an IP layer 812, and TCP/UDP layer 814. Further, the application 816 is connected with the socket 807. In an embodiment of the present disclosure, the eBPF prog1 802 extracts source IP, source Port, destination IP, destination Port, protocol, and packet payload length from the socket. Based on the payload length, the eBPF calculates the throughput of the flow. The eBPF prog1 802 stores these stats in maps called as the fast_sk_map 804. At step (d), the traffic differentiator 714 is configured to read these stats from the fast_sk_map 804. At step (e), the traffic differentiator 714 is configured to store these stats in a separate database 818. At step (f), the traffic differentiator 714 is further configured to check the database 818 to get a flow rate and maintain the database 806 to estimate the flow rate of a current PDU session if history for this session is already present in the database 818. A format of the information stored in the database is shown below in Table 4.

TABLE 4

| APP UID | DEST IP Address: Port | DNN | Protocol | FlowRate | Data |
|---|---|---|---|---|---|
| 10341 | 159.145.53.107:443 | sa.sktelecom1.com | TCP | 75 Mbps | 100 MB |
| 10112 | 59.47.53.10:1095 | sa.sktelecom2.com | TCP | 15 Mbps | 75 MB |
| 10261 | 53.97.153.107.9127 | sa.sktelecom3.com | UDP | 10 Mbps | 30 MB |
| 10942 | fd00:971a::10581 | sa.sktelecom4.com | UDP | 31 Mbps | 45 MB |
| 10315 | fd00:976a:55641 | sa.sktelecom5.com | TCP | 5 Mbps | 16 MB |
| . . . | . . . | . . . | . . . | . . . | . . . |

At step (g), the traffic differentiator 714 is configured to estimate or generate the best policy for a given PDU session based on the flow rate and informs the stack tuner. The traffic differentiator 714 is further configured to provide a traffic load parameter/which indicates an average amount of traffic been downloaded for a given matching flow based on database pool history. η helps in estimating the number of CPU cores required and Tx/Rx queues to be allocated for this PDU session.

Figure 9A:
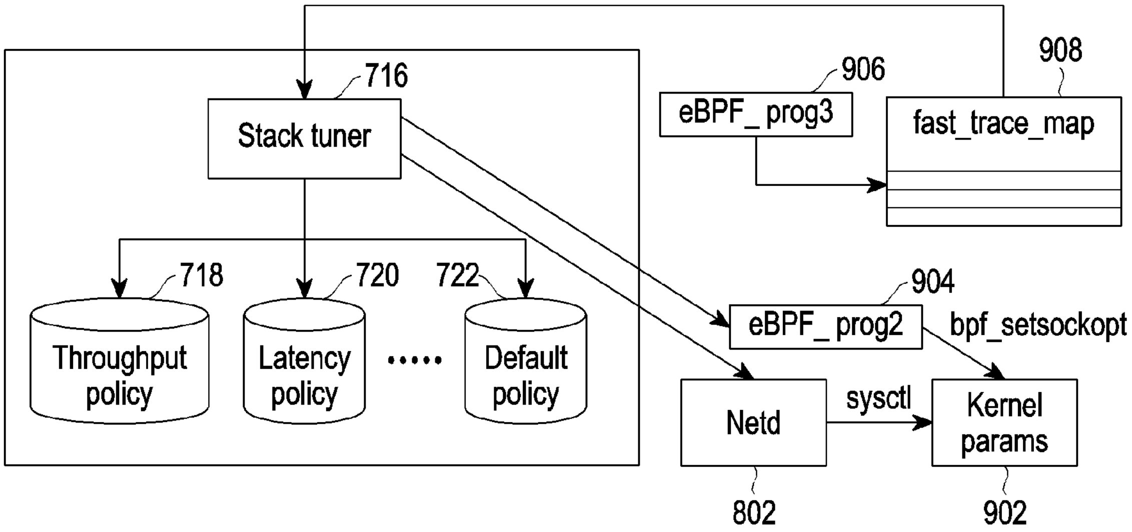
FIGS. 9A, 9B and 9C are block diagrams illustrating an example process for dynamically updating/tuning one or more policies, according to various embodiments.
Figure 9B:
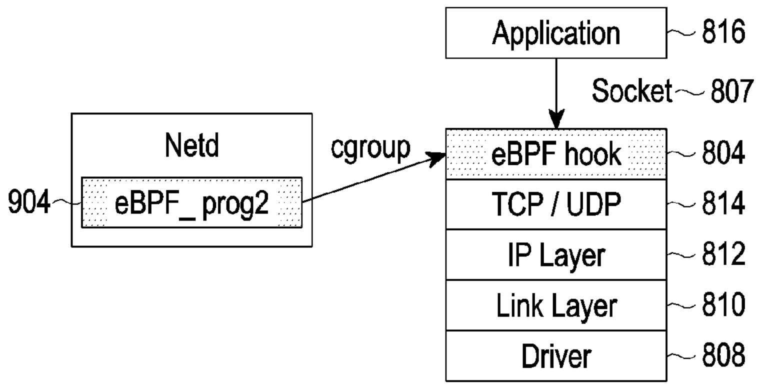
Figure 9C:
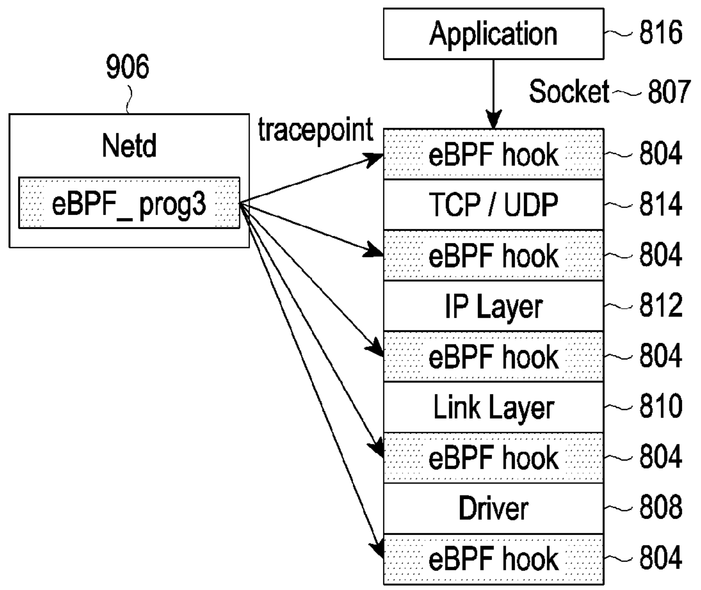

FIGS. 9A, 9B and 9C are block diagrams illustrating an example process for dynamically updating/tuning one or more policies, according to various embodiments. As explained with respect to FIG. 5, the one or more policies are dynamically updated/tuned for each of the one or more ongoing PDU sessions based on the flow rate, the predefined threshold flow rate, and the one or more RAT characteristics.

In an embodiment of the present disclosure, the stack tuner 716 dynamically creates the one or more policies based on information received from the traffic differentiator, such as the flow rate and the predefined threshold flow rate. Further, the stack tuner 716 configures the kernel parameters 902 via ebpf socket options or via sysctl interface to apply the one or more policies per PDU session. In an embodiment of the present disclosure, the stack tuner 716 also monitors socket-level statistics for each PDU session and dynamically tunes the one or more policies.

The stack tuner 716 creates the one or more policies, such as the throughput enhancement policy 718, the latency reduction policy 720, and the default policy 722. In an embodiment of the present disclosure, the throughput enhancement policy 718 tunes the stack to ensure the highest throughput possible. Under the throughput enhancement policy, queues and buffer sizes are set to high, Generic Receive Offload (GRO) is enabled, parameters specific to low latency are disabled, the lowest interrupt rate is assigned for CPUs, and the like.

Further, the latency reduction policy 720 tunes the stack to achieve the lowest latency. Under the latency reduction policy, the queues and buffer sizes are set to low, and the highest interrupt rate is assigned to forward packets to the application immediately. Further, latency-specific parameters, such as tcp_low_latency are enabled which gives preference to latency over throughput. Furthermore, GRO is disabled, and auto-corking is performed to avoid delays due to coalescing. The latency reduction policy also boosts the connection speed from the beginning of the connection by setting the initial congestion window to a high value and disabling the slow start phase. Furthermore, the default policy tunes the stack with moderate values for all other kinds of traffic. In an embodiment of the present disclosure, other kinds of traffic correspond to traffic not corresponding to any slice and traffic which does not fall under throughput oriented or latency sensitive, such as location detection, application updates in background, and the like.

Furthermore, upon receiving the policy to be loaded from the traffic differentiator, the stack tuner 716 configures the set of system parameters e.g., the kernel parameters 902, with the values already tuned from the one or more policies. To effect policy to only per-connection, one more eBPF program e.g., known as eBPF prog2 904 is inserted into the kernel from Netd layer 802 which is attached to cgroup as shown in FIGS. 9A and 9B. This program sets socket options using ebpf helper function bpf_setsockopt which is provided by the kernel. Bpf_setsockopt needs bpf socket argument which is of type bpf sock ops which expects IP and port info. To get this information for the current session, the stack tuner 716 refers to the map which is already updated with the application UID and extracts the required information from the socket containing the application UID. Bpf setsockopt supports only limited socket options due to which sysctl interface is used to configure the remaining parameters. In an embodiment of the present disclosure, the remaining parameters are the parameters for which socket options are not implemented yet. This effects system-wide behavior instead of per slice. This is not an issue if only a single PDU session is running in a device at any given time or multiple PDU sessions of the same slice type. However, if two PDU sessions are running which belong to different slice type then tuning the kernel parameters for PDU sessions is challenging. To address this challenge, the FAST module 602 provides preference for the foreground running application. The stack tuner configures the kernel parameters to boost the connection of the foreground application. For Example: if the foreground application belongs to the URLLC slice then it loads the latency reduction policy. Further, if the foreground application belongs to the eMBB slice then it loads the throughput enhancement policy. An example representation of eBPF prog2 904 is shown in FIG. 9B.

Further, the stack tuner 716 monitors the socket level statistics, such as packet drops, error rates, and the like. The stack tuner 716 runs an eBPF prog3 906 attached to the trace point, as shown in FIG. 9C. In an embodiment of the present disclosure, multiple events are enabled from /sys/kernel/tracing/set event, such as net:*, tcp:*, udp:*, sock:*, and the like. Furthermore, the stack tuner obtains all relevant statistics for the required socket by filtering tracebuffers with IP, Port associated with the application UID present in UidOwnerMap. These statistics are read and stored in a map fast trace map 908. The stack tuner 716 then reads fast trace map 908 to track for connection level drops and dynamically tunes the one or more policies.

The stack tuner 716 also monitors overall statistics available at multiple layers. These statistics are summarized in Table 3 as mentioned above. If there are packet drops or performance degradation, then the stack tuner dynamically tunes the one or more policies at runtime using sysctl to improve the performance. The stack tuner updates the one or more policies based on the RSSI and RSRQ values of the RAT connected. Under bad network conditions and for lesser 9, the one or more policies are tuned to less aggressive values compared to previously set values for achieving peak throughputs or lowest latencies. For example, buffers are set to moderate values to avoid bufferbloating problems, interrupt rates may be modified to moderate from low for eMBB slice, and INIT CWND may be set to a less value for avoiding higher network jitter.

In an embodiment of the present disclosure, Table 1 depicts the key parameters that are tuned by the stack tuner of the FAST module 602. Further, Table 2 depicts the TCP/IP Parameters that are tuned by the stack tuner 716. The set of parameters mentioned in the tables 1 and 2 are available under /proc/sys/net/ipv4, /proc/sys/net/ipv6, /proc/sys/net/core, /sys/class/net/rmnet X (where x=0, 1, . . . , 9), /sys/class/net/wlan0. The tuned values mentioned in Tables 1 and 2 are not static but are tuned dynamically. Further, algorithms used in the FAST module 602 for tuning the kernel parameters are explained below as algorithm 1 and algorithm 2.

Algorithm 1 FAST Algorithm

Definition:
$U_{id}$: APP UID of the PDU session associated to the Network Slice $N_1$
UidOwnerMap : map which contains $U_{id}$ of the PDU session
Stats : All statistics of PDU sessions associated with $U_{id}$ upon running eBPF_prog1
$DB_{Stats}$: Database pool which contains Stats of all PDU sessions and its history -continued Algorithm 1 FAST Algorithm

```
T_i: Type of Network Slice N_1
η: Traffic load parameter which indicates an average
amount of traffic been downloaded for a given match-
ing flow based on DB_Stats
τ: Threshold of traffic load parameter η Input:
Network Slice Information such as URSP Rule, RSSI &
RSRQ values; UidOwnerMap Output:
Policy
for each slice N_1 do
  Get U_id from its URSP Rule
  UidOwnerMap ← mapUIDviaNetd(U_id)
  Stats ← runEbpfPROG1(U_id)
  DB_Stats ← append(Stats)
  Predict T_1 , η from DB_Stats
  if T_1 is of type uRLLC then
    if η < τ then
      Policy ← moderateValuesTuning
    else
      Policy ← lowLatencyTuning
    end if
  else if T_1 is of type eMBB then
    if η < τ then
      Policy ← moderateValuesTuning
    else
      Policy ← highThroughputTuning
    end if
  else
    Policy ← defaultValuesTuning
  end if
end for
```

Algorithm 2 FAST Algorithm - Dynamic Tuning

```
Definition:
Socket_Stats: All statistics of PDU sessions associated
with U_id upon running cBPF_progl
Uid^RAT: RAT Characteristics information associated
with U_id.
T: Threshold of RAT Characteristics U_id^RAT
Input:
Socket level statistics like packet drops, η. RAT Charac-
teristics etc.,: UidOwnerMap
Output:Policy
while running eBPF_prog3 do
  Get IP. Port of a PDU Session associated with U_id
   from UidOwnerMap
  Socket_Stats ← TraceBufferFilter(IP, Port)
  fast_trace_map ← append(Socket_Stats)
end while
 Stock Tuner Module
while read fast_track_map do
  if U_id^RAT < T then
    Policy ← moderateValuesTuning
  end if
  if packet drops then
    Policy ← moderateValuesTuning
  end if
  if η < τ then
    Policy ← moderateValuesTuning
  end if
end while
```

Figure 10A:
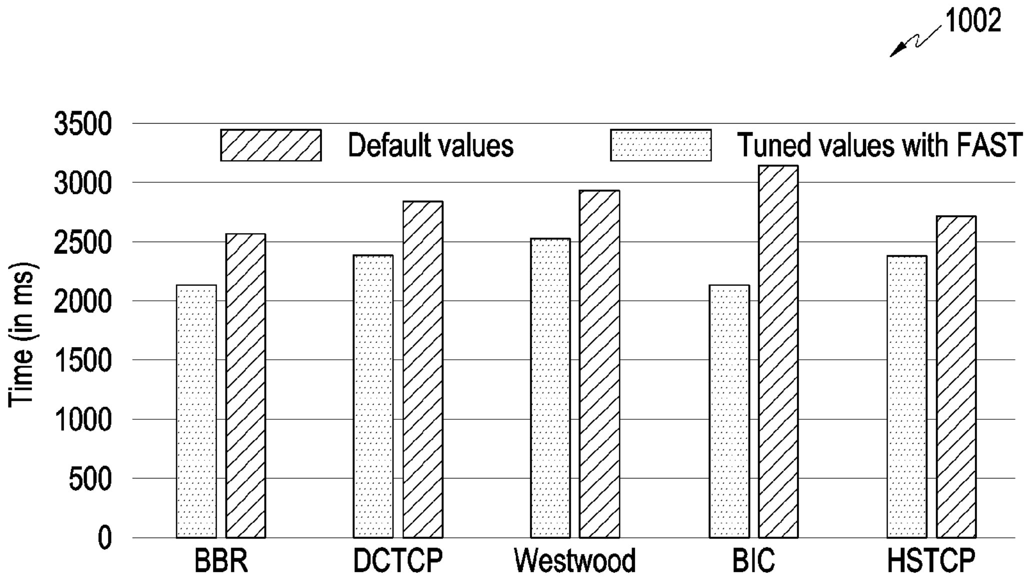
FIG. 10A is a graph illustrating an upload time comparison for tuning congestion control-related parameters of a Flow Aware Stack Tuner (FAST) module with conventional modules, according to various embodiments.
Figure 10B:
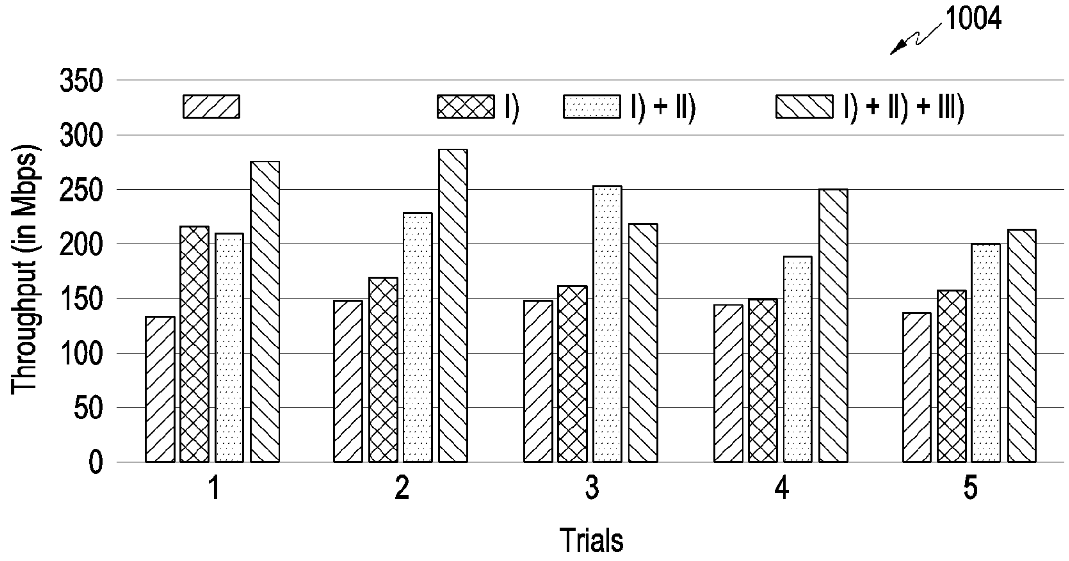
FIG. 10B is a graph illustrating a throughput comparison for tuning Transmission Control Protocol (TCP) related parameters of the FAST module with conventional modules for dynamically tuning the one or more policies, according to various embodiments.

FIG. 10A is a graph 1002 illustrating an upload time comparison for tuning congestion control-related parameters of the FAST module 602 with conventional modules, according to various embodiments. Further, FIG. 10B is a graph 1004 illustrating a throughput comparison for tuning Transmission Control Protocol (TCP) related parameters of the FAST module 602 with the conventional modules for dynamically tuning the one or more policies, according to various embodiments. For the sake of brevity, FIGS. 10A and 10B are explained together.

In a real network slicing deployment scenario, eMBB PDU sessions involve higher incoming or outgoing traffic rates, larger file sizes, and thick streams whereas URLLC PDU sessions involve short flows, relatively lesser file sizes, and lesser traffic rates. To mimic a real network slicing deployment scenario, a test is performed with different file sizes and by varying test duration. The performance of the FAST module 602 is evaluated below scenarios with two S22 devices, one without FAST module 602 where default values are used and another device with FAST module 602.

Further, the congestion control-related parameters are tuned for latency-sensitive traffic where the initial congestion window is set to a bigger value to push more packets from the beginning of the session, reduced tcp_limit_output_bytes to reduce buffering in the network stack, and disabled tcp_slow_start_after_idle from default 1 to 0 to avoid falling back to a slow start which keeps congestion window large. Results of comparison between different congestion control (CC) techniques including low latency CC, such as Data Center Transmission Control Protocol (DCTCP), High Speed Transmission Control Protocol (HSTCP), and delay-based CC BBR, Westwood vs default BIC CC are depicted in the graph 1002 of FIG. 10A. The first bar of the graph 1002 represents the UE 500 with the FAST module 602 and the second bar of the graph 1002 represents the UE 500 not using the FAST module 602. In an embodiment of the present disclosure, logs are collected using Packet capture (PCAP) tool and time taken are analyzed for first 10000 packets. Average of multiple trials is plotted on the y-axis. A consistent ~400 ms improvement is seen between the FAST solution and without the FAST solution. A slight improvement is observed with delay and low latency CC when compared to loss-based CC.

Further, the throughput is tested with different file sizes by modifying one or more TCP parameters, such as buffers tcp_rmem, tcp_wmem, and backlog queues are kept moderate for latency traffic and very high for throughput-oriented traffic. Further, depending on the incoming/outgoing packet rate, dev_weight is increased to let the CPU handles more number of packets on a New Application Programming Interface (NAPI) interrupt. Furthermore, to avoid delays, tcp_low_latency is enabled, and tcp_auto_corking and GRO are disabled for latency traffic flows. To improve performance under heavy packet loss, tcp_thin_linear_timeouts is enabled which postpones exponential back-off mode up to 6 retransmission timeouts, and tcp_reordering is tuned up to 10 which increases the packet reordering rate. For extremely low sensitive traffic, busy_poll is tuned to a nonzero value to let the CPU continuously poll the received queues without sleeping. For bulk traffic, netdev_budget value is tuned to a higher value to let the kernel handle a maximum number of overall packets on a NAPI interrupt. The result of the comparison upon modifying the above-mentioned TCP parameters is illustrated in graph 1004 of FIG. 10B. In graph 1004, download throughputs for each of the above categories are compared with default values of the FAST module 602 and an improvement of up to 73.5% is observed. The first bar in graph 1004 represents the UE 500 not using the FAST module 602. Whereas, the second bar, the third bar and the fourth bar represents the UE 500 with the FAST module 602. Further, definitions of the one or more TCP parameters are provided in Table 5 below.

TABLE 5

| Parameters | Definitions |
|---|---|
| TCP, UDP send queues | send buffers |
| TCP, UDP receive queue | receive buffers |
| tcp_limit_output_bytes | controls small queue limits per TCP socket |
| Tx, rx queue lengths | ring buffers to which the network interface writes/takes packets |
| netdev_max_backlog | queue to hold packets before forwarding to the upper layers |
| netdev_budget | How much packet processing can be spent for napi per CPU |
| dev_weight | weight of the backlog poll loop |
| tcp_autocorking | coalesce small writes by an app |
| Gro enabling or disabling | combines similar packets |
| rps_sock_flow_entries | size of the hash table for a flow |
| flow_limit_table_len | used to limit no of packets queued to a backlog for each flow |
| tcp_low_latency | tells TCP to prefer latency |
| tcp_thin_linear_timeouts | reduces application-layer latency |
| busy_read | Low latency busy poll timeout for socket reads |
| busy_poll | Low latency busy poll timeout for the poll and select |

Figure 11:
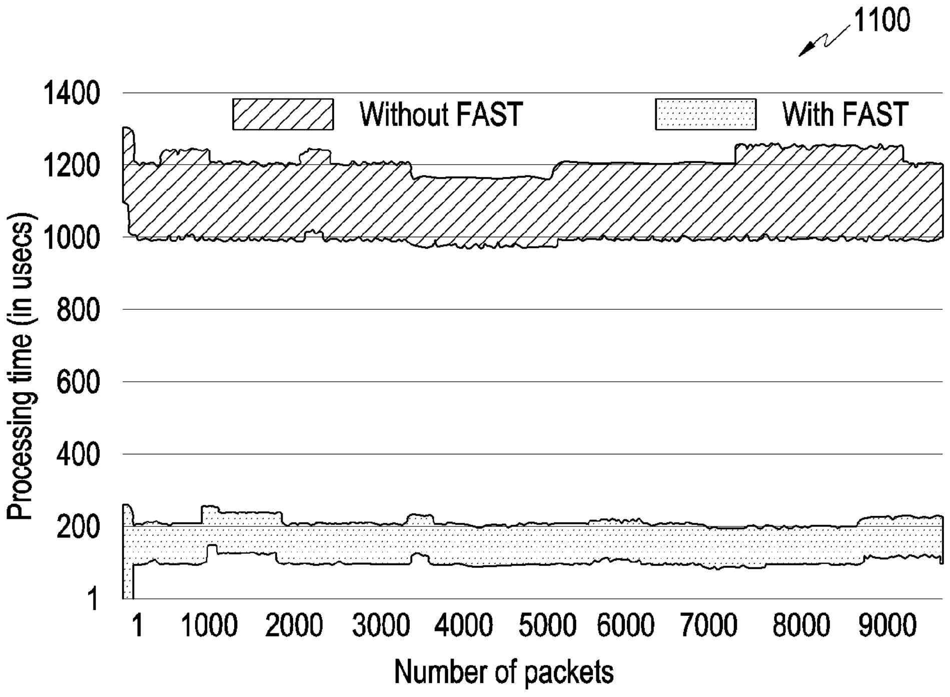
FIG. 11 is a graph illustrating a kernel processing time comparison for latency traffic parameters of the FAST module with conventional modules, according to various embodiments.

FIG. 11 is a graph 1100 illustrating a kernel processing time comparison for latency traffic parameters of the FAST module 602 with conventional modules, according to various embodiments. The graph 1100 depicts the kernel processing time for the latency traffic (gaming session) while bulk traffic is downloaded in another session.

To measure android stack latency, parallel sessions involving both bulk traffic representing eMBB and short flows representing URLLC are tested. In one session, a 5 GB file is being downloaded in the background while an online game is played in another session in the foreground. For devices with FAST, /sys/class/net/rmnet, dataX/queues/rx-X, and/sys/class/net/rmnet dataX/queues/tx-X are modified to map two Receiving (Rx) & Transmission (Tx) queues to CPU cores 2,3 for file downloading session and another two Rx & Tx queues to CPU cores 4,5 for gaming session respectively. Further, incoming traffic of the gaming session is redirected to queue 4,5 and the limited file downloading session is redirected to queue 2,3. To measure processing time in the kernel, the packets of the gaming socket are timestamped using the SO_TIMESTAMP socket option. The results of the measurement are plotted in the graph 1100 for gaming session for both the FAST module 602 and without the FAST module 602, where processing time in the kernel are plotted on the Y-axis in units of usecs, and a number of packets timestamped are plotted on X-axis. The upper portion of the graph 1100 represents the UE 500 not using the FAST module 602 and the lower portion of the graph 1100 represents the UE 500 with the FAST module 602. There is a consistent improvement of around 1000 usecs in response time with the FAST module 602.

Figure 12:
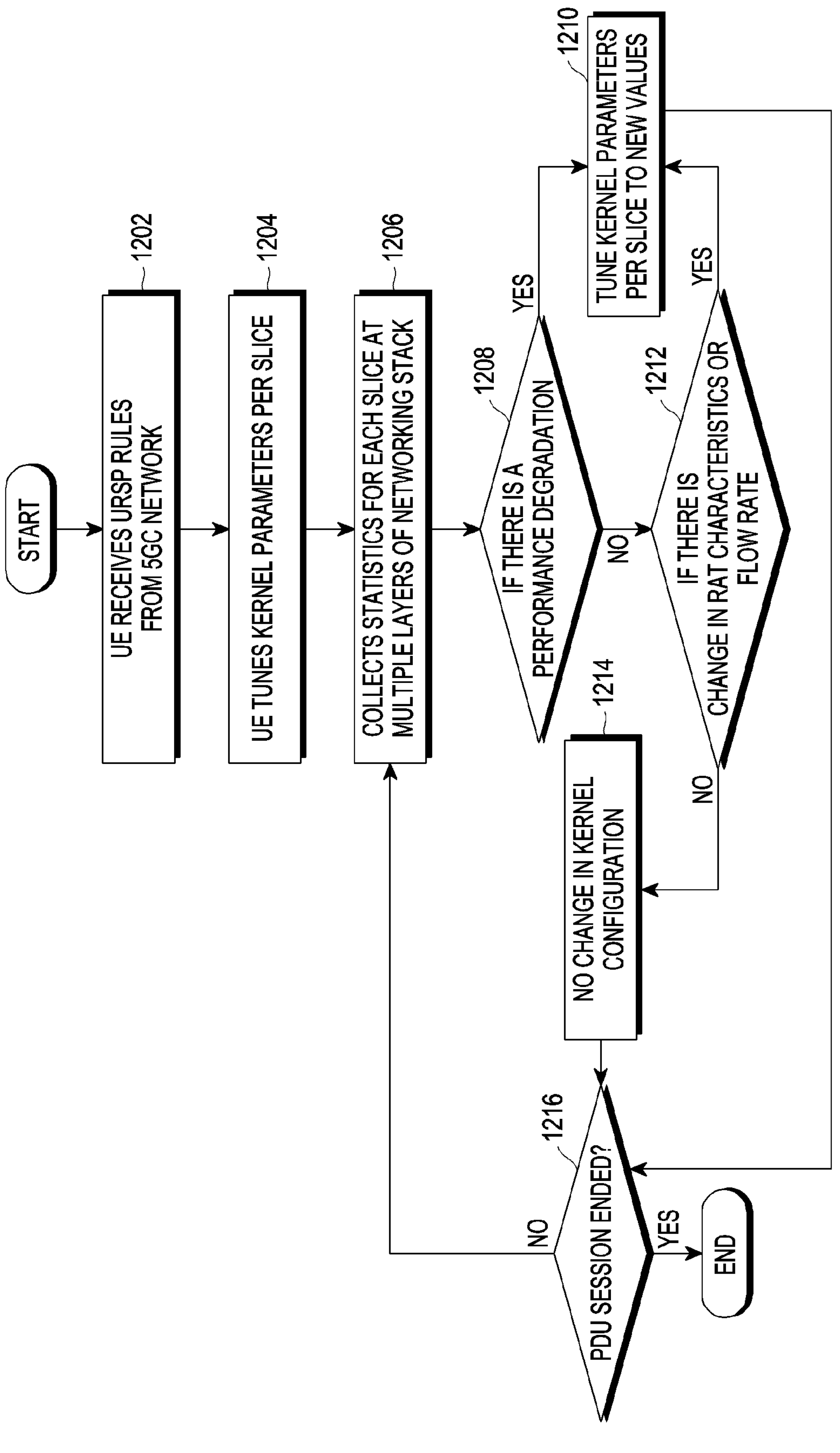
FIG. 12 is a flowchart illustrating an example operation of the UE for tuning system parameters for the one or more network slices, according to various embodiments.

FIG. 12 is a flowchart illustrating an example operation of the UE 500 for tuning system parameters for the one or more network slices, according to various embodiments.

At step 1202, the UE 500 receives the set of URSP rules from the 5GC network.

Further, at step 1204, the UE 500 tunes the set of system parameters per network slice. The UE 500 further estimates the flow rate of each PDU session associated with each network slice, updates the set of system parameters and applies the set of URSP rules after the set of system parameters are updated.

At step 1206, the UE 500 collects statistics for each network slice at multiple layers of the networking stack.

At step 1208, the UE 500 determines whether there is performance degradation due to packet drops. If yes, the UE 500 tunes the set of system parameters per slice to new values to improve the latency and throughput of the PDU sessions at step 1210. Further, in case the result of the determination at step 1208 is no, the UE 500 determines whether there is a change in RAT characteristics or the flow rate at step 1212. In a case, if the result of the determination at step 1212 is yes, then the UE 500 performs the step 1210. However, if the result of the determination at step 1212 is no, then the UE 500 makes no change in the kernel configuration at step 1214. Further, at step 1216, the UE 500 determines if the PDU session has ended. If not, the UE 500 performs the step 1206.

Figure 13:
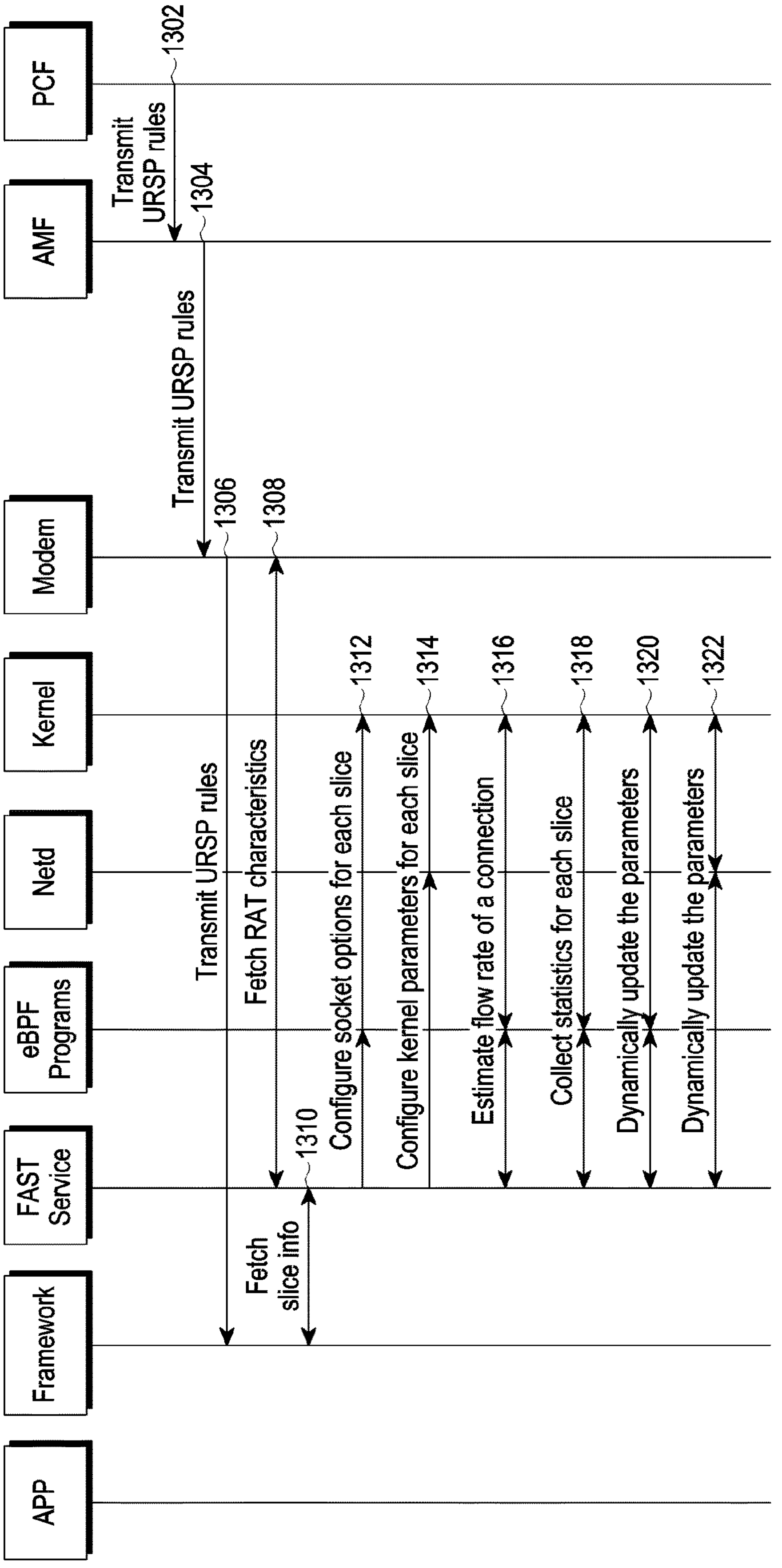
FIG. 13 is a signal flow diagram depicting an example operation of the UE for tuning system parameters for the one or more network slices, according to various embodiments.

FIG. 13 is a signal flow diagram depicting an operation of the UE 500 for tuning system parameters for the one or more network slices, according to various embodiments.

At step 1302, the PCF of the 5GC sends the set of URSP rules to the AMF. At step 1304, the AMF sends the set of URSP rules to the UE modem. At step 1306, the UE modem sends the set of URSP rules to the framework.

At step 1308, the FAST module 602 requests the modem to fetch the RAT characteristics, such as RSSI, RSRP, RSRQ, NR and LTE bands, bandwidth availability, and the like. At step 1310, the FAST module 602 receives the slice-specific information from the URSP manager and derives the application UID from the slice-specific information.

At step 1312, the FAST module 602 configures the socket options via the EBPF programs to apply the one or more policies per PDU session. At step 1314, the FAST module 602 configures the set of system parameters for which the socket options are not available via the netd sysctl interface.

Further, at step 1316, the FAST collects the statistics, such as source IP, source port, destination IP, destination port, protocol, and packet length for the ongoing PDU sessions from the eBPF program (which in turn gathers information from the kernel) and estimates the flowrate of all the ongoing PDU sessions. The FAST module 602 collects statistics, such as packet drops, error rates, and the like, for each PDU session associated with a network slice via eBPF program (which in turn gathers information from multiple layers of the kernel) at step 1318. Furthermore, the FAST module 602 dynamically updates the kernel parameters either via the ebpf programs or via the netd sysctl interface at step 1320 and step 1322 respectively.

Figure 14:
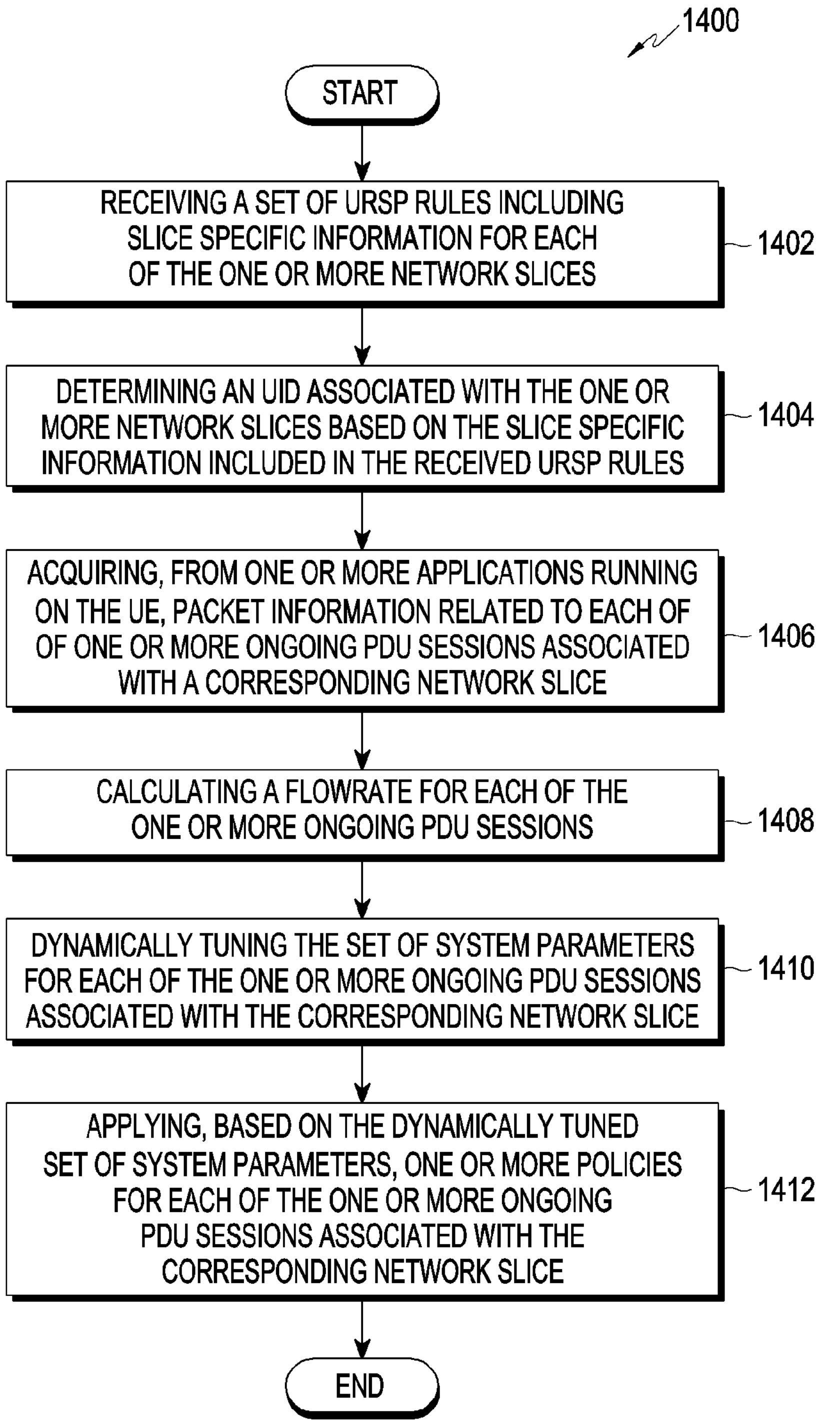
FIG. 14 is a flowchart illustrating an example method for tuning system parameters for the one or more network slices, according to various embodiments.

FIG. 14 is a flowchart illustrating an example method 1400 for tuning system parameters for the one or more network slices, according to various embodiments. As explained with respect to FIG. 1, the one or more processors 502 of the UE 500 tunes the system parameters for the one or more network slices.

At step 1402, the method 1400 includes receiving, from a network (508), a set of User Equipment Route Selection (URSP) rules including slice-specific information for each of the one or more network slices. In an embodiment of the present disclosure, the set of URSP rules includes a traffic descriptor and a route selection descriptor. The traffic descriptor includes a rule precedence and an application identifier. In an example embodiment of the present disclosure, the route selection descriptor includes a network slice selection, a Session and Service Continuity (SSC) mode, a Data Network Name (DNN) selection, an access type preference, and the like.

At step 1404, the method 1400 includes determining an application User ID (UID) associated with the one or more network slices based on the slice-specific information included in the received URSP rules.

At step 1406, the method 1400 includes acquiring, from one or more applications running on the UE 500, packet information related to each of one or more ongoing Protocol Data Unit (PDU) sessions associated with a corresponding network slice of the one or more network slices based on the received set of URSP rules and the determined application UID. In an example embodiment of the present disclosure, the packet information includes information associated with a source Internet Protocol (IP), a source port, a destination IP, a destination port, a protocol, a packet length, and the like.

At step 1408, the method 1400 includes calculating a flowrate for each of the one or more ongoing PDU sessions based on the received set of URSP rules, the determined application UID, and the acquired packet information related to each of one or more ongoing PDU sessions associated with the corresponding network slice.

At step 1410, the method 1400 includes dynamically tuning the set of system parameters for each of the one or more ongoing PDU sessions associated with the corresponding network slice based on the calculated flow rate and a predefined threshold flow rate.

At step 1412, the method 1400 includes applying, based on the dynamically tuned set of system parameters, one or more policies for each of the one or more ongoing PDU sessions associated with the corresponding network slice. In an example embodiment of the present disclosure, the set of system parameters corresponds to a set of kernel parameters. The set of kernel parameters corresponds to at least one of one or more Transmission Control Protocol/Internet Protocol (TCP/IP) parameters or one or more driver layer parameters.

For applying the one or more policies, the method 1400 includes determining whether one or more socket options are available for each of the one or more policies. Further, the method 1400 includes configuring the one or more socket options via one or more Extended Berkeley Packet Filters (eBPFs) upon the determination that the one or more socket options are available for each of the one or more policies. Furthermore, the method 1400 includes applying the one or more policies for each of the one or more ongoing PDU sessions associated with the corresponding network slice based on the configured one or more socket options.

Further, for applying the one or more policies, the method 1400 includes configuring the set of system parameters via a network interface upon the determination that the one or more socket options are unavailable for each of the one or more policies. Further, the method 1400 includes applying the one or more policies for each of the one or more ongoing PDU sessions associated with the corresponding network slice based on the configured set of system parameters.

Further, the method 1400 includes obtaining one or more statistics for the one or more ongoing PDU sessions from a set of layers of a Kernel via one or more eBPFs. The one or more statistics are related to packet drops and error rates. The method 1400 includes generating one or more static values for the set of system parameters based on the obtained one or more statistics. Furthermore, the method 1400 includes dynamically updating the set of system parameters for each of the one or more ongoing PDU sessions via one of a netd sysctl interface and the one or more eBPFs based on the generated one or more static values.

Furthermore, the method 1400 includes determining whether there is a performance degradation in the one or more ongoing PDU sessions based on the obtained one or more statistics. The method 1400 includes determining whether there is a change in at least one of one or more Radio Access Technology (RAT) characteristics or the flow rate upon determining that there is performance degradation in the one or more ongoing PDU sessions. Further, the method 1400 includes dynamically tuning the set of system parameters for each of the one or more ongoing PDU sessions associated with the corresponding network slice to one or more new values based on the flow rate and the predefined threshold flow rate upon determining a change in at least one of the one or more RAT characteristics or the flow rate.

Further, the method 1400 includes identifying a foreground application running on the UE 500. The method 1400 includes determining a type of the identified foreground application. Furthermore, the method 1400 includes loading the one or more policies for each of the one or more ongoing PDU sessions based on the determined type of the identified foreground application.

For dynamically tuning the set of system parameters for each of the one or more ongoing PDU sessions, the method 1400 includes obtaining one or more RAT characteristics from a Modulator-Demodulator (MODEM) upon calculating the flow rate. In an example embodiment of the present disclosure, the one or more RAT characteristics include Received Signal Strength Indicator (RSSI), Reference Signal Received Power (RSRP), Reference Signal Received Quality (RSRQ), New Radio (NR), and Long-Term Evolution (LTE) bands, bandwidth availability, and the like. The method 1400 includes dynamically updating the one or more policies for each of the one or more ongoing PDU sessions based on the calculated flow rate, the predefined threshold flow rate, and the obtained one or more RAT characteristics. In an example embodiment of the present disclosure, the one or more policies include a throughput enhancement policy, latency reduction policy, default policy, and the like.

Furthermore, the method 1400 includes dynamically creating the one or more policies for each of the one or more ongoing PDU sessions associated with the corresponding network slice based on the calculated flow rate and the predefined threshold flow rate.

While the above steps illustrated in FIG. 14 are described in a particular sequence, the steps may occur in variations to the sequence in accordance with various embodiments of the present disclosure. Further, the details related to various steps of FIG. 14, are already covered in the description related to FIGS. 1-13 may not be discussed again in detail here for the sake of brevity.

The disclosed method has several technical advantages over the conventional methods. In conventional methods, for example, the electronic device applies a common setting globally on every pixel or region, to all video frames. However, each pixel or region of the image frame has a unique perceptual relevance and aesthetic enhancement requirement. The disclosed approach allows users to apply more sophisticated aesthetic effects to video (e.g., long exposure silhouette employing motion blurs) while maintaining static regions crystal sharp, and it also enables optimized multi-frame processing for HDR. As a result, processing is limited to only those areas that require such upgrades, which enhances the user's experience.

The present disclosure provides for various technical advancements based on the key features discussed above. Further, the present disclosure discloses a Flow/Slice Aware Stack Tuner (FAST) which tunes kernel parameters based on the slice-specific information and the flow rate per connection per slice. Further, the present disclosure (FAST) creates policies, such as throughput enhancement, latency reduction, and default to configure per slice. The present disclosure also tracks packet drops, and error rates with the help of the Extended Berkeley Packet Filter (eBPF) hook added in the kernel and dynamically tune the policies at runtime. Furthermore, the present disclosure configures the kernel parameters unique to the network slice (eMBB, URLLC, and the like). The present disclosure also dynamically creates or tunes the policies based on the slice-specific information and the flow rate for each session per slice to give a better user experience for latency and throughput-oriented applications. Furthermore, the present disclosure determines optimum values for the kernel parameters based on statistics available at different layers of the kernel. The present disclosure dynamically tunes the policies to adapt to volatile 5G network conditions by constantly monitoring RAT characteristics, such as RSSI, RSRP, RSRQ, NR and LTE bands, bandwidth availability, and the like. Further, the present disclosure is deployed in the UE 500 to ensure promised benefits of the network slice, such as lower latency and higher throughput for network slices. The present disclosure aims to make the 5G more Robust by solving android smartphones inability of tuning kernel parameters for different network slices such, as URLLC (latency sensitive), eMBB (throughput oriented) traffic, and the like.

While specific language has been used to describe the present subject matter, any limitations arising on account thereto, are not intended. Further, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for tuning system parameters for one or more network slices by a user equipment, the method comprising:

receiving, from a network, a set of user equipment route selection policy (URSP) rules including slice-specific information for each of the one or more network slices;

determining an application user ID (UID) associated with the one or more network slices based on the slice-specific information;

acquiring, from one or more applications running on the UE, packet information related to each of one or more ongoing protocol data unit (PDU) sessions associated with a corresponding network slice of the one or more network slices based on the received set of URSP rules and the determined application UID;

obtaining a flow rate for each of the one or more ongoing PDU sessions based on the received set of URSP rules, the determined application UID, and the acquired packet information;

tuning a set of system parameters for the one or more ongoing PDU sessions based on the obtained flow rate and a threshold flow rate; and applying, based on the dynamically tuned set of system parameters, one or more policies for the one or more ongoing PDU sessions, wherein the one or more policies for the one or more ongoing PDU sessions are determined based on a type of a foreground application running on the UE, and wherein the type of the foreground application running on the UE indicates one of a plurality of types comprising at least one of a first type indicating that the foreground application belongs to a ultra-reliable low latency communications (URLLC) slice, or a second type indicating that the foreground application belongs to an enhanced mobile broadband (eMBB) slice.

2. The method of claim 1, wherein the set of URSP rules comprises a traffic descriptor and a route selection descriptor, wherein the traffic descriptor comprises a rule precedence and an application identifier, and wherein the route selection descriptor comprises a network slice selection, a session and service continuity (SSC) mode, a data network name (DNN) selection, and an access type preference.

3. The method of claim 1, wherein the packet information includes information associated with a source internet protocol (IP), a source port, a destination IP, a destination port, a protocol, and a packet length.

4. The method of claim 1, wherein the set of system parameters corresponds to a set of kernel parameters, and wherein the set of kernel parameters corresponds to at least one of one or more transmission control protocol/internet protocol (TCP/IP) parameters or one or more driver layer parameters.

5. The method of claim 1, wherein applying the one or more policies comprises:

determining whether one or more socket options are available for each of the one or more policies;

based on determining that the one or more socket options are available for each of the one or more policies, configuring the one or more socket options via one or more extended Berkeley packet filters (eBPFs), applying the one or more policies for the one or more ongoing PDU sessions based on the configured one or more socket options, and based on determining that the one or more socket options are unavailable for each of the one or more policies, configuring the set of system parameters via a network interface based on determining that the one or more socket options are unavailable for each of the one or more policies, and applying the one or more policies for the one or more ongoing PDU sessions based on the configured set of system parameters.

6. The method of claim 5, further comprising:

determining whether there is a performance degradation in the one or more ongoing PDU sessions based on the obtained one or more statistics;

determining whether there is a change in at least one of one or more radio access technology (RAT) characteristics or the flow rate upon determining that there is the performance degradation in the one or more ongoing PDU sessions; and dynamically tuning the set of system parameters for the one or more ongoing PDU sessions associated with the corresponding network slice to one or more new values based on the flow rate and the specified threshold flow rate based on determining a change in at least one of the one or more RAT characteristics or the flow rate.

7. The method of claim 1, further comprising:

obtaining one or more statistics for the one or more ongoing PDU sessions from a set of layers of a kernel via one or more extended Berkeley packet filters (eBPFs), wherein the one or more statistics are related to packet drops and error rates;

generating one or more static values for the set of system parameters based on the obtained one or more statistics; and dynamically updating the set of system parameters for the one or more ongoing PDU sessions via one of a netd sysctl interface and the one or more eBPFs based on the generated one or more static values.

8. The method of claim 1, wherein tuning the set of system parameters for the one or more ongoing PDU sessions comprises:

obtaining one or more RAT characteristics from a modulator-demodulator (MODEM) based on calculating the flow rate, wherein the one or more RAT characteristics comprise received signal strength indicator (RSSI), reference signal received power (RSRP), reference signal received quality (RSRQ), new radio (NR) and long-term evolution (LTE) bands, and bandwidth availability; and dynamically updating the one or more policies for the one or more ongoing PDU sessions based on the obtained flow rate, the threshold flow rate, and the obtained one or more RAT characteristics, wherein the one or more policies comprise at least one of throughput enhancement policy, latency reduction policy, and default policy.

9. The method of claim 1, further comprising:

dynamically creating the one or more policies for each of the one or more ongoing PDU sessions associated with the corresponding network slice based on the obtained flow rate and the threshold flow rate.

10. A user equipment (UE) for tuning system parameters for one or more network slices, the UE comprising:

a memory; and at least one processor comprising processing circuitry; and memory storing instructions which, when executed individually and/or collectively by the at least one processor, cause the UE to:

receive, from a network, a set of user equipment route selection policy (URSP) rules including slice-specific information for each of the one or more network slices;

determine an application user ID (UID) associated with the one or more network slices based on the slice-specific information;

acquire, from one or more applications running on the UE, packet information related to each of one or more ongoing protocol data unit (PDU) sessions associated with a corresponding network slice of the one or more network slices based on the received set of URSP rules and the determined application UID;

obtain a flow rate for each of the one or more ongoing PDU sessions based on the received set of URSP rules, the determined application UID, and the acquired packet information;

tune a set of system parameters for the one or more ongoing PDU sessions based on the obtained flow rate and a threshold flow rate; and apply, based on the tuned set of system parameters, one or more policies for the one or more ongoing PDU sessions, wherein the one or more policies for the one or more ongoing PDU sessions are determined based on a type of a foreground application running on the UE, and wherein the type of the foreground application running on the UE indicates one of a plurality of types comprising at least one of a first type indicating that the foreground application belongs to a ultra-reliable low latency communications (URLLC) slice, or a second type indicating that the foreground application belongs to an enhanced mobile broadband (eMBB slice.

11. The UE of claim 10, wherein the set of URSP rules comprises a traffic descriptor and a route selection descriptor, wherein the traffic descriptor comprises a rule precedence and an application identifier, and wherein the route selection descriptor comprises a network slice selection, a session and service continuity (SSC) mode, a data network name (DNN) selection, and an access type preference.

12. The UE of claim 10, wherein the packet information includes information associated with a source internet protocol (IP), a source port, a destination IP, a destination port, a protocol, and a packet length.

13. The UE of claim 10, wherein the set of system parameters corresponds to a set of kernel parameters, and wherein the set of kernel parameters correspond to at least one of one or more transmission control protocol/internet protocol (TCP/IP) parameters or one or more driver layer parameters.

14. The UE of claim 10, wherein, for applying the one or more policies, the memory stores instructions which, when executed individually and/or collectively by the at least one processor, cause the UE to:

determine whether one or more socket options are available for each of the one or more policies;

based on determining that the one or more socket options are available for each of the one or more policies, configure the one or more socket options via one or more extended Berkeley packet filters (eBPFs) based on determining that the one or more socket options are available for each of the one or more policies, and apply the one or more policies for the one or more ongoing PDU sessions based on the configured one or more socket options; and based on determining that the one or more socket options are unavailable for each of the one or more policies, configure the set of system parameters via a network interface, and apply the one or more policies for each of the one or more ongoing PDU sessions associated with the corresponding network slice based on the configured set of system parameters.

15. The UE of claim 10, wherein the memory stores instructions which, when executed individually and/or collectively by the at least one processor, cause the UE to:

obtain one or more statistics for the one or more ongoing PDU sessions from a set of layers of a kernel via one or more extended Berkeley packet filters (eBPFs), wherein the one or more statistics are related to packet drops and error rates;

generate one or more static values for the set of system parameters based on the obtained one or more statistics; and dynamically update the set of system parameters for the one or more ongoing PDU sessions via one of a netd sysctl interface and the one or more eBPFs based on the generated one or more static values.

16. The UE of claim 10, wherein the memory stores instructions which, when executed individually and/or collectively by the at least one processor, cause the UE to:

determine whether there is a performance degradation in the one or more ongoing PDU sessions based on the obtained one or more statistics;

determine whether there is a change in at least one of one or more radio access technology (RAT) characteristics or the flow rate based on determining that there is the performance degradation in the one or more ongoing PDU sessions; and dynamically tune the set of system parameters for the one or more ongoing PDU sessions associated with the corresponding network slice to one or more new values based on the flow rate and the specified threshold flow rate upon determining a change in at least one of the one or more RAT characteristics or the flow rate.

17. The UE of claim 10, wherein, for tuning the set of system parameters for the one or more ongoing PDU sessions, the memory stores instructions which, when executed individually and/or collectively by the at least one processor, cause the UE to:

obtain one or more RAT characteristics from a modulator-demodulator (MODEM) based on obtaining the flow rate, wherein the one or more RAT characteristics comprise received signal strength indicator (RSSI), reference signal received power (RSRP), reference signal received quality (RSRQ), new radio (NR) and long-term evolution (LTE) bands, and bandwidth availability; and dynamically update the one or more policies for the one or more ongoing PDU sessions based on the obtained flow rate, the threshold flow rate, and the obtained one or more RAT characteristics, wherein the one or more policies comprise at least one of throughput enhancement policy, latency reduction policy, and default policy.

18. The UE of claim 10, wherein the memory stores instructions which, when executed individually and/or collectively by the at least one processor, cause the UE to:

dynamically create the one or more policies for the one or more ongoing PDU sessions based on the obtained flow rate and the threshold flow rate.

* * * * *